(12) United States Patent
Niwa

(10) Patent No.: US 7,433,494 B2
(45) Date of Patent: Oct. 7, 2008

(54) MOVING BODY DETECTING APPARATUS

(75) Inventor: Akimasa Niwa, Toyoake (JP)

(73) Assignee: DENSO CORPORATION, Kariya (JP)

( * ) Notice: Subject to any disclaimer, the term of this patent is extended or adjusted under 35 U.S.C. 154(b) by 722 days.

(21) Appl. No.: 10/662,401

(22) Filed: Sep. 16, 2003

(65) Prior Publication Data
US 2004/0057600 A1    Mar. 25, 2004

(30) Foreign Application Priority Data

| Sep. 19, 2002 | (JP) | ............................. 2002-273388 |
| Dec. 18, 2002 | (JP) | ............................. 2002-366934 |
| Mar. 10, 2003 | (JP) | ............................. 2003-063714 |

(51) Int. Cl.
*G06K 9/00* (2006.01)
*H04N 5/225* (2006.01)

(52) U.S. Cl. ...................... 382/103; 382/190; 382/224; 348/169

(58) Field of Classification Search ................. 382/103, 382/107, 190, 203, 218, 236, 224; 348/169
See application file for complete search history.

(56) References Cited

U.S. PATENT DOCUMENTS

| 5,063,524 | A | * | 11/1991 | Ferre et al. ................... 382/107 |
| 5,243,418 | A | * | 9/1993 | Kuno et al. ................. 348/155 |
| 5,335,180 | A | * | 8/1994 | Takahashi et al. ........... 701/117 |
| 5,606,376 | A | * | 2/1997 | Shinohara ................... 348/701 |
| 5,838,365 | A | * | 11/1998 | Sawasaki et al. ............ 348/169 |
| 6,205,242 | B1 | * | 3/2001 | Onoguchi ................... 382/154 |
| 6,307,951 | B1 | * | 10/2001 | Tanigawa et al. ............ 382/103 |
| 6,483,429 | B1 | | 11/2002 | Yasui et al. |
| 6,819,778 | B2 | * | 11/2004 | Kamei ........................ 382/103 |
| 6,931,146 | B2 | * | 8/2005 | Aoki et al. .................. 382/107 |
| 7,133,537 | B1 | * | 11/2006 | Reid .......................... 382/103 |

(Continued)

FOREIGN PATENT DOCUMENTS

JP    61-195093    8/1986

(Continued)

OTHER PUBLICATIONS

Notification of Reasons for Rejection from Japanese Patent Office issued on Feb. 6, 2007 for corresponding Japanese patent application No. 2003-063714 (a copy and English translation thereof).

(Continued)

*Primary Examiner*—Daniel G Mariam
(74) *Attorney, Agent, or Firm*—Posz Law Group, PLC

(57) ABSTRACT

Provided is a moving body detecting apparatus capable of detecting only a body to be notified without detecting a body similar in feature to the body to be notified. To confirm whether a break-in body appears in static images from a camera, the apparatus sets a monitoring region for monitoring a window portion in the static images and a monitoring region for monitoring a door body portion therein, and produces difference images from the static images. A pixel set existing in common to the difference images continuing in time sequence is extracted from an image composed so that pixel values reach a maximum. On the basis of the motion vector, a decision is made as to whether the movement of the pixel set from the window portion to the door body portion occurs or not.

64 Claims, 29 Drawing Sheets

U.S. PATENT DOCUMENTS

2002/0051058 A1    5/2002    Ito et al.

FOREIGN PATENT DOCUMENTS

| JP | 2-61792 | 3/1990 |
| JP | 2-61793 | 3/1990 |
| JP | A-H04-273689 | 9/1992 |
| JP | 6-217323 | 8/1994 |
| JP | 7-78252 | 3/1995 |
| JP | 7-220049 | 8/1995 |
| JP | 8-147475 | 6/1996 |
| JP | 11-203567 | 7/1999 |
| JP | A-H11-198763 | 7/1999 |
| JP | 11-248433 | 9/1999 |
| JP | 11-313252 | 11/1999 |
| JP | A-11-337500 | 12/1999 |
| JP | 2000-128031 | 5/2000 |
| JP | 2001-160146 | 6/2001 |
| JP | 2001-187553 | 7/2001 |
| JP | 2001-333420 | 11/2001 |
| JP | A-2002-176640 | 6/2002 |

OTHER PUBLICATIONS

Notification of Reasons for Rejection from Japanese Patent Office issued on Dec. 19, 2006 for the corresponding Japanese patent application No. 2002-366934 (a copy and English translation thereof).

Notification of Reasons for Rejection from Japanese Patent Office issued on Dec. 5, 2006 for the corresponding Japanese patent application No. 2002-273388 (a copy and English translation thereof).

* cited by examiner

PICKUP IMAGE

MONITORING REGION
DATABASE

REGION 203
COORDINATES 1 (200, 20)
COORDINATES 2 (400, 60)

MONITORING REGION
BOUNDARY LINE
INFORMATION

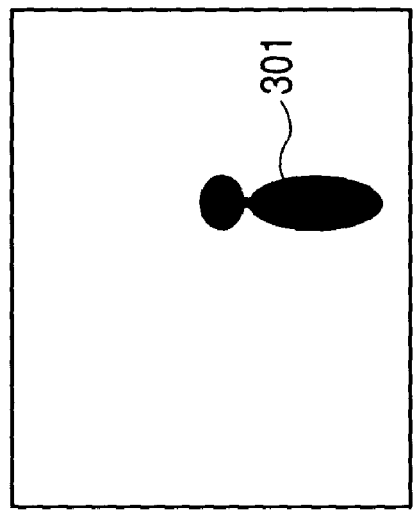
FIG. 3A BACKGROUND IMAGE
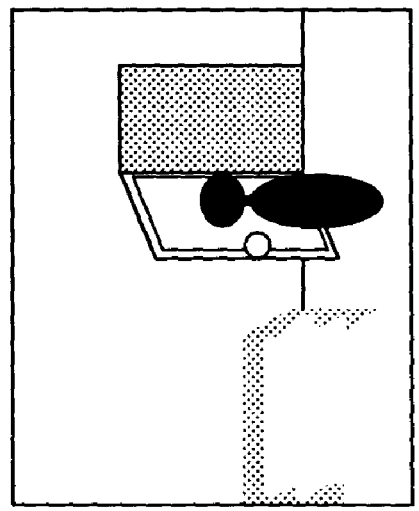
FIG. 3B PRESENT IMAGE
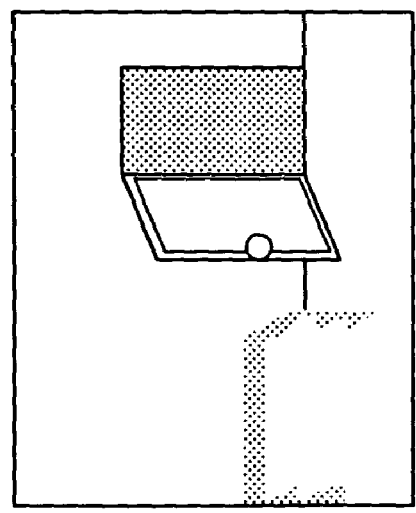
FIG. 3C DIFFERENCE IMAGE

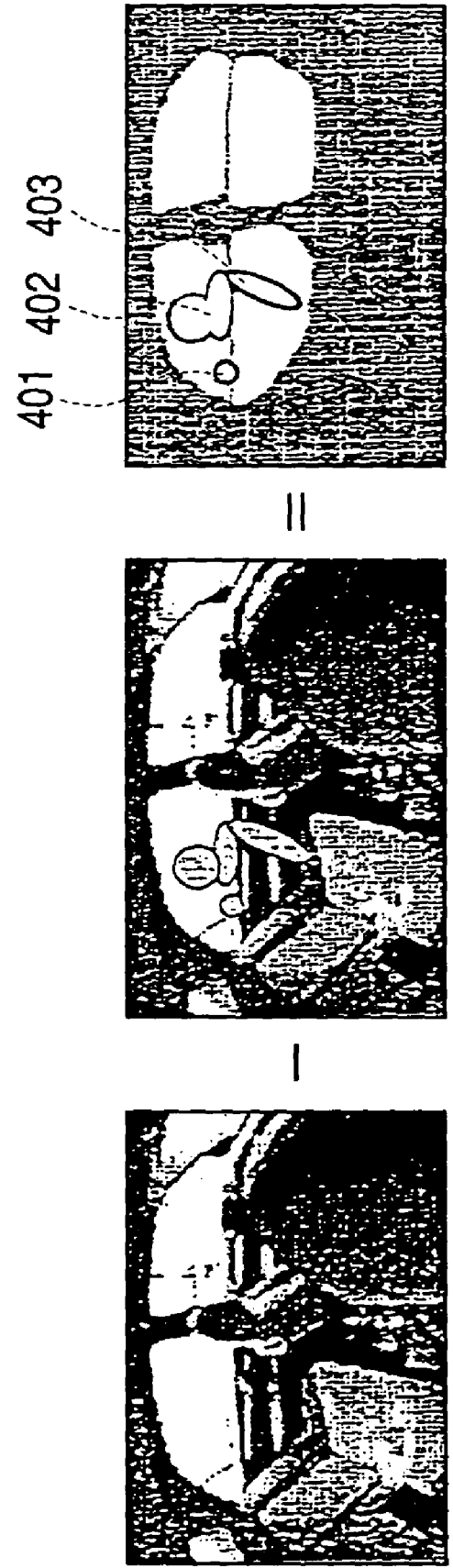

PIXEL VALUE OF PIXEL A

| IMAGE | 101 | 102 | 103 | 104 | 105 | 106 | 107 | 108 | 109 | 110 |
|---|---|---|---|---|---|---|---|---|---|---|
| PIXEL VALUE | 25 | 15 | 37 | 98 | 65 | 105 | 107 | 75 | 54 | 60 |

MAXIMUM PIXEL VALUE 98 n-th PRESENT IMAGE n+4-th PRESENT IMAGE n-th DIFFERENCE IMAGE n+4-th DIFFERENCE IMAGE

STARTING POINT INFORMATION

↑ EDGE EXTRACTION

INPUT IMAGE AT START OF IMAGE COMPOSING

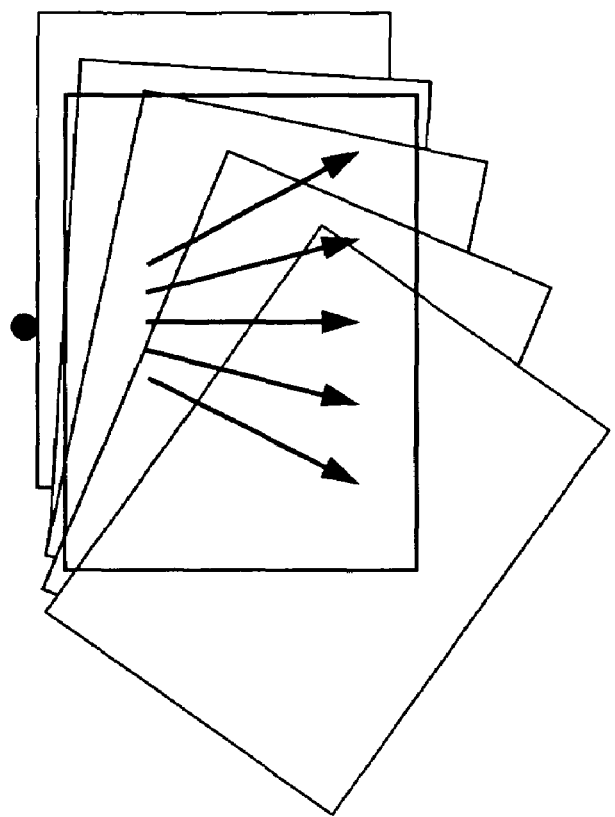
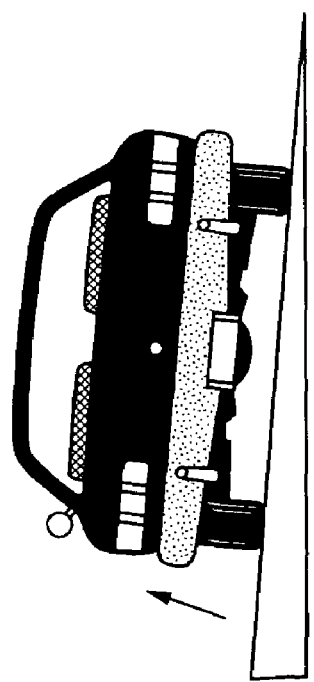
FIG. 23B
FIG. 23A

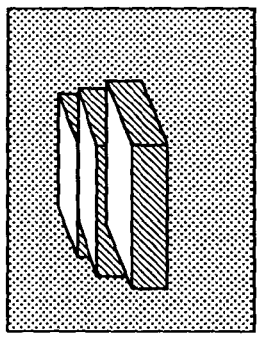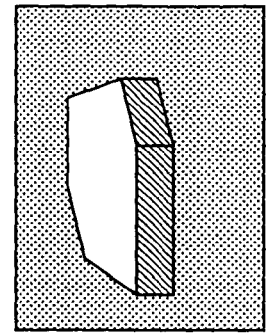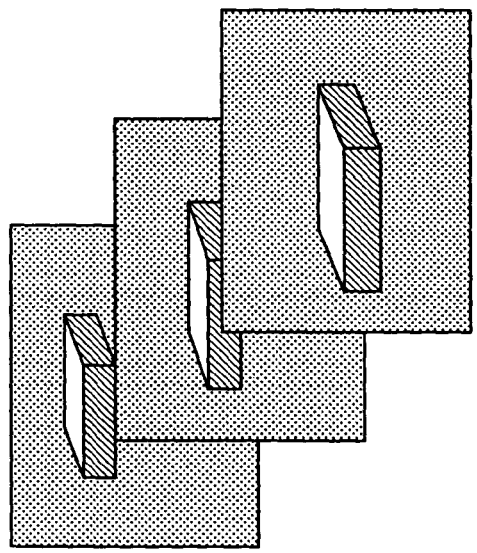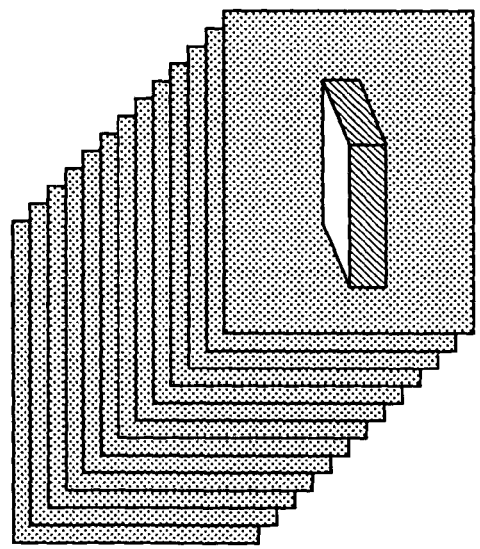
FIG. 27A
FIG. 27B

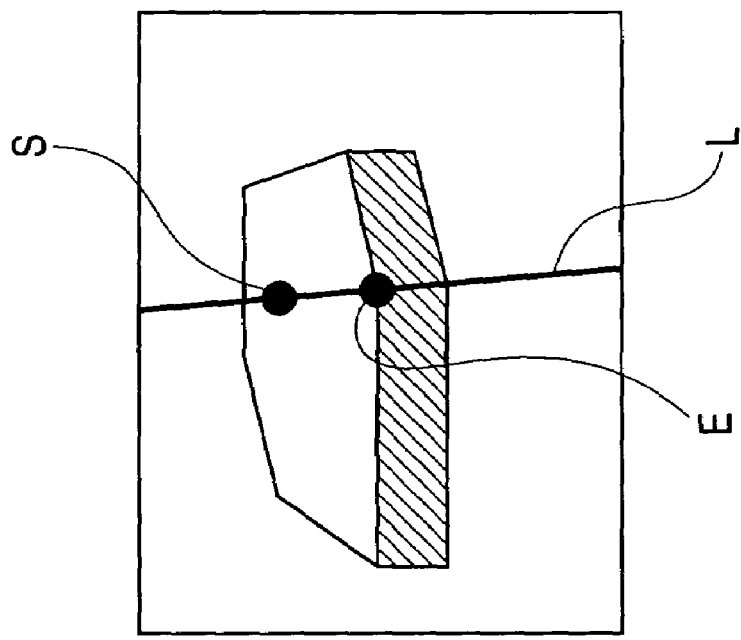
FIG. 28B
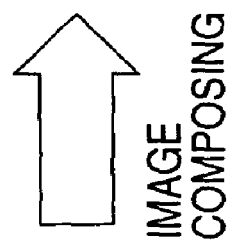
IMAGE COMPOSING
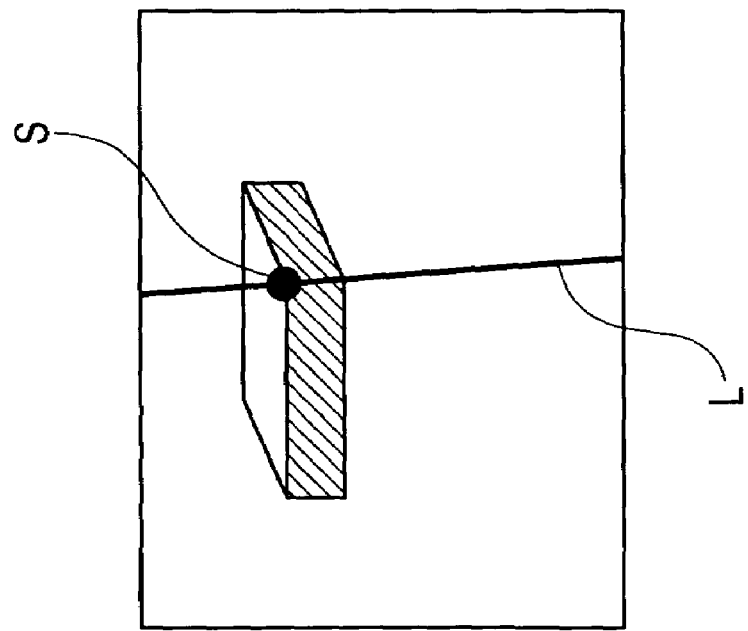
FIG. 28A ical value)±1000 pixels (width)", when moving bodies
MOVING BODY DETECTING APPARATUS

BACKGROUND OF THE INVENTION

1) Field of the Invention

The present invention relates to a technique of detecting a moving body by conducting various processing on an image picked up.

2) Description of the Related Art

As one of various conventional crime-prevention systems, there has been known a technique in which a moving body detecting apparatus detects a break-in body through the use of an image to make notification on the basis of the detection results. In general, this moving body detecting apparatus previously stores an image including no moving body as a background image and calculates a difference between the an image newly picked up and the previously stored background image for recognition of a moving body. Concretely, a difference between an image picked up and a background image is obtained to conducting threshold processing on a difference value for each pixel for producing a binary image so that a moving body is extracted through noise removal and labeling processing on the binary image. Moreover, a feature quantity of the moving body is calculated to make a decision as to whether or not the calculated feature quantity agrees with a predetermined judgmental criterion for making a decision as to whether that moving body is to be notified or not. In this case, the "feature quantity" signifies a physical quantity characterizing a moving body and, for example, there are "existence time" for which a moving body exists in an image, "area" of the moving body, "vertical and horizontal dimensions" of the moving body, "moving speed" at which the moving body moves, and others.

Meanwhile, in a case in which a moving body detecting apparatus is used as an approach detecting apparatus for a vehicle, a shadow of a moving body, together with the moving body, can appear at a window portion of the vehicle due to sunlight. For this reason, some moving body detecting apparatuses involves a technique of eliminating a shadow of a moving body from a picked-up image for precise detection of the moving body (for example, see Japanese Patent Laid-Open No. HEI 07-220049). Concretely, a difference between a background image and a background shifted image obtained by shifting the background image by a predetermined number of pixels horizontally and vertically is calculated to produce a background difference image which in turn, is binary-processed to produce a background binary image. moreover, as with the background image, with respect to a picked-up image obtained by taking a pickup (photograph) of a moving body, a pickup difference image is produced on the basis of a difference between a pickup image and a pickup shifted image obtained by shifting the pickup image by a predetermined number of pixels vertically and horizontally and the pickup difference image is binary-processed to produce a pickup binary image. Still moreover, the background binary image and the pickup binary image are exclusive-OR-processed to an exclusive-OR image, and the exclusive-OR image and the background binary image are AND-processed to remove the shadow of the moving body.

In addition, as shown in FIG. 29, a passer or bicycle passing by a vehicle can be reflected in a window portion of the vehicle (see "803" in the illustration). FIG. 29 shows an image obtained by photographing a window portion (see "801" in the illustration) and a door portion (see "802" in the illustration) near a rear seat from its interior side. Still additionally, a shadow of a building due to sunlight, a reflection of head light of a vehicle in the nighttime, a shadow of a tree or the like can be reflected in the interior of a vehicle (see "804" in the illustration). For this reason, in some moving body detecting apparatuses, the aforesaid judgmental criterion is corrected on the basis of a feature quantity of each of things most extracted as moving bodies from a pickup image in the past (for example, Japanese Paten Laid-Open No. HEI 11-203567. For example, in the case of the aforesaid "area", if the judgmental criterion is set to be "area=10000 pixels (central value)±1000 pixels (width)", when moving bodies whose areas are 8000 pixels to 10000 pixels are most extracted therefrom, the aforesaid judgmental criterion is corrected to "area=9000 pixels (central value)±1000 pixels (width)". Incidentally, likewise, the correction is made with respect to the other judgmental criteria such as "existence time".

However, even if, as mentioned above, the shadow of a moving body is removed or the judgmental criterion is corrected on the basis of a feature quantity of a moving body, there is a possibility that the detected feature quantity of a moving body, such as a passer or shadow of a building, agrees with a judgmental criterion. In this case, the aforesaid moving body detecting apparatus is at risk of detecting that moving body as a body to be notified in error. Moreover, in a case in which the aforesaid judgmental criterion is set in advance or through correction on the basis of a feature of the whole body of a thief, for example, when only the upper half of the body or arm of the thief is reflected in a window portion of a vehicle, there is a possibility that the feature quantity of that thief can disagree with the aforesaid judgmental criterion and, in this case, the moving body detecting apparatus cannot detect the thief as a body to be notified. It can be considered that this applies likewise to moving body detecting apparatuses designed to detect a body to be notified on the basis of a feature quantity of a moving body. That is, for example, in the case of preventing a person committing a theft (which will be referred to hereinafter as a "thief" from breaking in the interior of a vehicle, both a passer and the thief are a human being and, hence, the feature quantities thereof becomes similar to each other. This is because the feature of the passer agrees with the judgmental criterion set for the purpose of detecting the thief.

Furthermore, the employment of such a moving body detecting apparatus is not limited to vehicles but being also applicable to a spot such as an entrance or window of a building requiring the prevention of the break-in of a thief or a place such as a store or art museum requiring the prevention of approach of a thief around an article or picture.

SUMMARY OF THE INVENTION

The present invention has been developed in consideration of these situations, and it is therefore an object of the invention to provide a technique of detecting only a body to be notified without detecting a body similar in feature to the body to be notified.

Another object of the present invention is to provide a moving body detecting apparatus capable of accurately detecting a moving body which can fall into a background like a small moving body in a case in which a picked-up image does not have a sufficient contrast or if much noise is included in the picked-up image.

A further object of the present invention is to provide a displacement data extracting method and a body detecting apparatus capable of associating the same image pickup points shown in different images with a small calculation quantity to displacement data indicative of the displacement with high accuracy.

In accordance with a first aspect of the present invention, there is provided a moving body detecting apparatus characterized by detecting a body moving from an area permitting the existence of an body to an area inhibiting the existence of an body. Concretely, image acquiring means first acquires static images in an identical monitoring range continuing in time sequence. Subsequently, decision processing means receives a plurality of static images continuing in time sequence from the image acquiring means to make a comparison among these static images for making a decision as to whether or not a body moves from an "allowable area" set in advance in the monitoring range and allowing the existence of a body to an "unallowable area" set in advance in the monitoring range and inhibiting the existence of a body. The image acquiring means is realizable through the use of a photographing device such as a CCD camera or infrared camera, or it is also realizable with an interface device which obtains images picked up by a device separate from the moving body detecting apparatus.

Thus, since this moving body detecting apparatus is made to detect only a body moving the allowable area to the unallowable area as a body to be notified, for example, only a body to be notified is detectable without detecting an body similar in feature to the object to be notified, such as a passer or the like to a thief.

As an example, a description of the aforesaid allowable area and unallowable area will be given hereinbelow in the case of a moving body detecting apparatus used as a break-in detecting apparatus for a vehicle. The image acquiring means is set so as to take a photograph of a door from the interior side of the vehicle. For example, in a case in which a person committing a theft (which will be referred to hereinafter as a "thief") puts his/her hand through a window in the interior of the vehicle for stealing a purse or the like therefrom, the hand of the thief moves from a window portion in static images to a door body portion (a portion other than the window) therein. Therefore, the window portion of the door in the static images is set as the "allowable area" while the door body in the static images is set as the "unallowable area". In this case, the decision processing means makes a decision that the hand of the thief moving from the window portion to the door body portion in the static images is a body moving from the allowable area to the unallowable area. However, in a case in which a thing put in the interior of the vehicle is a large one such as a handbag and the body of the handbag appears in the door body portion in the static images and a handle of the handbag (which will be referred to simply as a "handle") appears in the window portion in the static images. In this case, the thief can grasp the handle and brings the handbag into the exterior of the vehicle through the window thereof without moving the hand from the window portion to the door body portion in the static images. At this time, the body of the handbag is shifted from the "unallowable area" to the "allowable area". Therefore, it is considered that, in the static images, the window portion is set as the "unallowable area" while the door body portion is set as the "allowable area". In this case, when the thief grasps the handle and brings the handbag out into the exterior of the vehicle, the decision processing means makes a decision that the body of the handbag moving from the door body portion to the window portion in the static images is an body moving from the allowable area to the unallowable area.

In this case, the aforesaid allowable area and unallowable area can be set as a point set such as bit map data. This eliminates the need to make a calculation for each pixel for making a decision as to whether or not each of the pixels of a difference image exists in an allowable are or the like, thus reducing the burden of the decision processing means. Moreover, it is also appropriate that the allowable area and the unallowable area are prescribed by the boundary lines of their outer circumferences. This enables the quantity of set data such as the allowable area to become only data for setting the boundary lines. This quantity decreases as compared with the data quantity in the case of the allowable area and others being set as a point set, which reduces the memory size of a storage unit for storing these set data. Incidentally, in the case of expressing the aforesaid boundary lines with a function, the quantity of the set data such as the allowable area is reducible. If the aforesaid boundary line is a straight line, the data quantity is further reducible in a manner such that the allowable area and others are set with only both end points of the straight line.

Meanwhile, if a moving body has a lower luminance as compared with a background, there is a possibility that the moving body is broken by the background. For example, in the case of a monochrome image, when the luminance value of the background is high and the luminance value of the moving body is low, even if the moving body exists at a given pixel, the luminance value of the background achieves domination over the luminance value of the moving body when the moving body moves and, hence, the moving body can disappear as a result. Therefore, in the aforesaid decision processing, it is considered that the decision processing means calculates an absolute value of the difference in luminance value between each of a plurality of static images from the image acquiring means and the background image stored in advance for each pixel to produce a plurality of difference images, and makes the comparison between the difference images to make a decision as to whether a body moving from the allowable area to the unallowable area exists or not. The "background image" signifies an image in which a moving body is absent and the "luminance value" may signify a simple brightness in the case of a monochrome image and, in the case of a color image, may signify an independent luminance value of each of RGB colors or the result luminance value of the three colors.

This difference image is produced by calculating the absolute value of the difference in luminance value between a static image received from the image acquiring means and a background image stored in advance and, hence, the difference image does not represent the comparison result in magnitude of luminance between both the images (which of the images is higher in luminance) but signifying the comparison result in the difference of luminance therebetween (the degree of the difference of luminance therebetween). Therefore, this eliminates the above-mentioned problem of a moving body being broken because the background luminance value is high, thereby enabling high-accuracy detection of a moving body.

Moreover, it is also appropriate that the moving body detecting apparatus further comprises preliminary decision processing means for making a comparison with respect to an allowable area between a background image stored in advance and a static image from the image acquiring means to make a preliminary decision as to whether or not the difference therebetween exceeds a predetermined value, and the decision processing means carries out the decision processing only when the preliminary decision result in the preliminary decision processing means shows the difference exceeding the predetermined value. In this case, the "predetermined value" signifies a quantitatively calculable physical quantity, for example, the number of pixels having different luminance values (disagreement in luminance) or the discrete degrees of these pixels.

As an example utilizing this arrangement, a description will be given hereinbelow of a case in which the moving body detecting apparatus is employed as a break-in detecting apparatus for a vehicle. First of all, a window portion in static images is set as an allowable area. Then, the preliminary decision processing means makes a comparison between the window portion (allowable area) of a background image stored in advance and the window portion (allowable area) of a static image from the image acquiring means to continuously make a decision as to whether or not a difference indicating the existence of a person exists between both the images. Following this, the decision processing means implements a series of decision processing only while the preliminary decision processing means continues the decision indicative of "a difference to which a person exists".

Thus, for example, only when a person is reflected in the window portion, that is, only when the person exists in the vicinity of a door in the exterior of the vehicle, the decision means carries out the above-mentioned series of decision processing. Therefore, the decision processing is conducted only when needed, and if the power per unit time to be used for the decision processing in the decision processing means is larger than the power per unit time to be used for the preliminary decision in the preliminary decision processing means, the power consumption per unit time is reducible as compared with the case in which the decision processing means implements the decision processing at all times.

In this connection, in the decision processing means, as a concrete manner of making a decision as to whether a moving body exists within a difference image, it is also appropriate to use a method in which a difference image is converted into binary image data and labeled so that, on the basis of information on area and position of the resultant pixel set, a decision is made as to whether a moving body exists or not. In this case, for example, the decision based on the "area and position of the pixel set" signifies that, of the pixel sets, a pixel set(s) whose area exceeds a predetermined value is selected so that, on the basis of whether or not the positional information on that pixel set indicates movement, a decision is made as to whether a moving body exists or not. This enables suppressing the influence of noises residing in an image acquired by the image acquiring means, thereby achieving high-accuracy detection on the existence of a moving body.

Moreover, it is also appropriate that, at the labeling, the area of the pixel set is simultaneously calculated through the use of a counter. This enables a more efficient decision as to whether or not a moving body exists in the image.

Still moreover, it is also appropriate that the decision processing means calculates a vector indicative of a motion of the pixel set on the basis of the positional information on the pixel set. This can reduce the data quantity as compared with the use of the pixel set and, hence, achieves the decision processing faster as compared with the decision processing based on the pixel set.

Yet moreover, it is also appropriate that, when a decision is made that a moving body exists, the decision processing means transmits the information on the existence of the moving body through a transmitting means to an external different apparatus such as a portable telephone pertaining to the owner of the vehicle or a telephone in a house of the owner of the vehicle. This achieves quick notification on the existence of an intruder from the exterior of the vehicle to the interior thereof to the owner of the vehicle.

In addition, it is also appropriate that the moving body detecting apparatus further comprises notifying (or broadcasting) means for notifying the existence of a moving body to a user, and the decision processing means issues a command to the notifying means to notify the existence of the moving body to the user when detecting the moving body existing in a monitoring range. As concrete examples of the notifying means, there are 1) a display is made on an indicator, 2) a notification is made through the use of a voice, 3) a lamp is lighted, 4) a buzzer is rung, and others. This enables the moving body detecting apparatus itself to notify the existence of a moving body to a user.

Still additionally, it is also appropriate that the moving body detecting apparatus further comprises warning means for warning a moving body, and the decision processing means warns the moving body when detecting that the moving body continuously exists in a monitoring range for a predetermined period of time. As the concrete examples of the warning means, there are 1) a notification is made through the use of a voice, 2) an alarm lamp is lighted, 3) a buzzer is rung, and others. This can prevent the break-in-vehicle of a moving body.

Yet additionally, when making a decision that the moving body exists therein, the decision processing means preserves an image of the moving body in an image storage means. This can store the fact that valuables such as a purse were stolen from the interior of the vehicle.

Preferably, the moving body detecting apparatus can also be used as an antitheft apparatus. Since the consumable power is limited during the vehicle storage, difficulty can be experienced in locating a sufficient light source(s), thus making it difficult to provide a static image having a sufficient contrast. Even in such a situation, the moving body detecting apparatus according to the present invention can achieve the detection with high accuracy, thus providing a high utility value.

According to the present invention, the decision processing means of the moving body detecting apparatus is also realizable in a manner such that a program functioning as the decision processing means is used and implemented in a computer incorporated into the moving body detecting apparatus. This program is recorded on a computer-readable recording medium such as a flexible disk, magnetic optical disk, CD-ROM, hard disk, ROM or RAM, and is loaded into the computer and activated when needed. It is also possible to perform the loading and activation through a network.

BRIEF DESCRIPTION OF THE DRAWINGS

Other objects and features of the present invention will become more readily apparent from the following detailed description of the preferred embodiments taken in conjunction with the accompanying drawings in which:

FIGS. 3A to 3C are illustrations useful for explaining processing for producing a difference image, and FIG. 3A shows a background image, FIG. 3B shows a present image, and FIG. 3C shows a difference image;

FIGS. 4A to 4C are illustrations useful for explaining the binary conversion and labeling processing as image processing, and FIG. 4A shows a background image, FIG. 4B shows a present image, and FIG. 4C shows a difference image further undergoing the binary conversion and labeling processing;

FIGS. 23A and 23B are illustrations useful for explaining an operation of an FOE displacement compensating unit when the posture of a vehicle is inclined in a roll direction;

FIGS. 27A and 27B are illustrations useful for a difference in effect between a conventional apparatus and the present invention;

FIGS. 28A and 28B are illustrations useful for explaining a method of detecting a trajectory length;

DESCRIPTION OF THE PREFERRED EMBODIMENTS

Embodiments of the present invention will be described hereinbelow with reference to the drawings.

First Embodiment (Configuration of Moving Body Detecting Apparatus)

Figure 1:
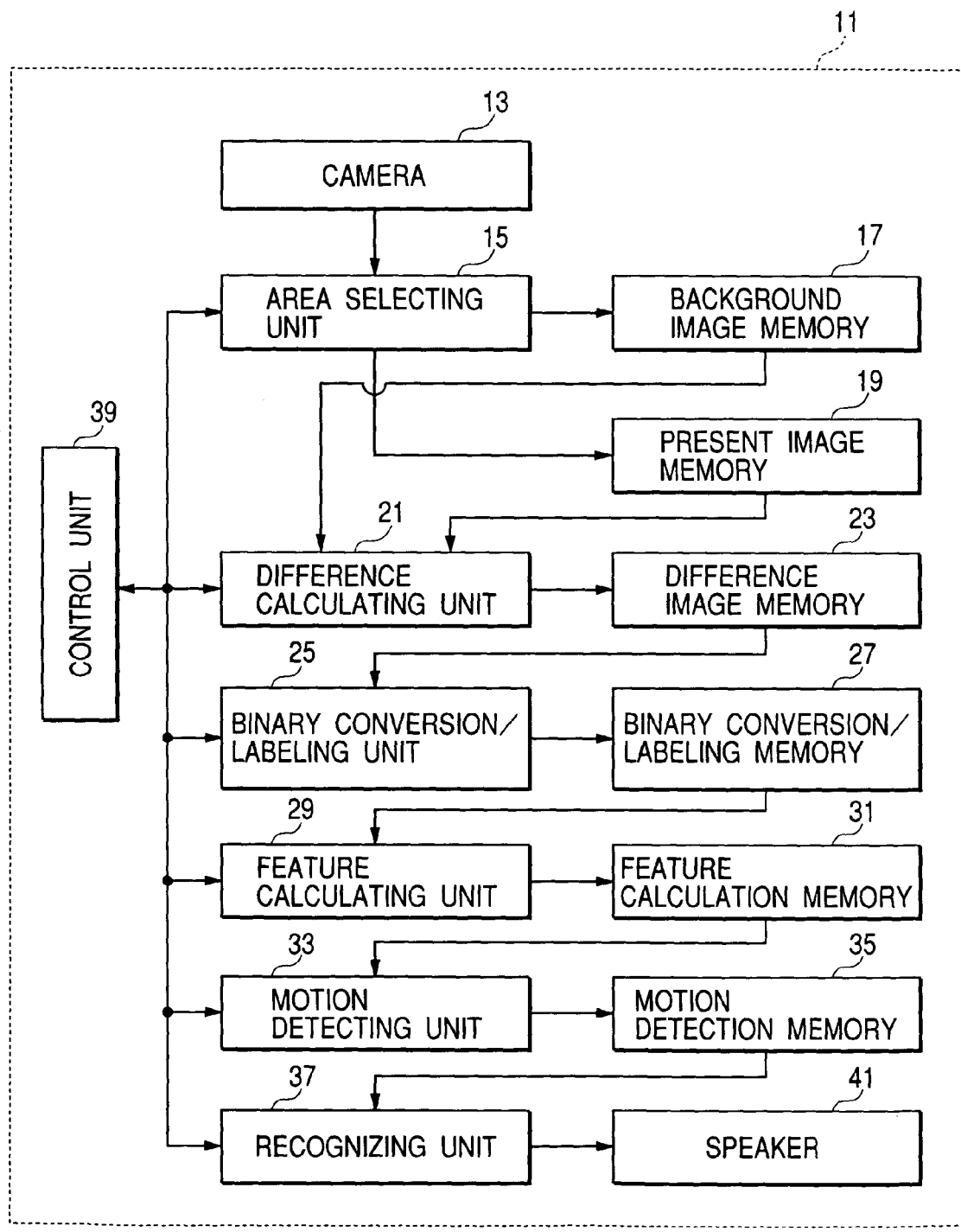
FIG. 1 is a block diagram showing an internal configuration of a moving body detecting apparatus according to a first embodiment of the present invention.

FIG. 1 is a block diagram showing an internal configuration of a moving body detecting apparatus according to a first embodiment of the present invention. The moving body detecting apparatus, generally designated at reference numeral 11, is made to function as an antitheft apparatus. As FIG. 1 shows, the moving body detecting apparatus 11 is made up of a camera 13, an area selecting unit 15, a difference calculating unit 21, a binary conversion/labeling unit 25, a feature calculating unit 29, a motion detecting unit 33, a recognizing unit 37, a control unit 39, a background image memory 17, a present image memory 19, a difference image memory 23, a binary conversion/labeling memory 27, a feature calculation memory 31, a motion detection memory 35 and a speaker 41.

Of these components, each of the area selecting unit 15, the difference calculating unit 21, the binary conversion/labeling unit 25, the feature calculating unit 29, the motion detecting unit 33, the recognizing unit 37 and the control unit 39 is constructed as an electronic circuit including a CPU, a ROM, a RAM and others. On the other hand, each of the background image memory 17, the present image memory 19, the difference image memory 23, the binary conversion/labeling memory 27, the feature calculation memory 31 and the motion detection memory 35 is constructed with a semiconductor memory such as a DRAM or SDRAM. Each of these memories can individually be constructed with a semiconductor memory, or all of these memories can also be constructed with one or plural semiconductor memories.

(Configuration of each of Parts of Moving Body Detecting Apparatus)

Figure 2A:
FIG. 2A is an illustration of a static image obtained by taking a photograph through the use of a camera.

The camera 13 is attached to a pillar or the like in the interior of a vehicle and is set to take a photograph continuously in time sequence in a state where break-in-possible places such as doors for a driver's seat and assistant driver's seat and their vicinities, right- and left-hand doors for a rear seat and their vicinities, a windshield and its vicinity and a rear windshield and its vicinity are set as a monitoring region or range. FIG. 2A shows a static image of the assistant driver's seat door and the rear seat left-hand door and their vicinities, obtained through the use of the camera 13. Moreover, the camera 13 has a performance to pick up 30 frames per second as monochrome static images. This camera 13 is realizable with a photographing device such as a CCD camera or infrared camera, or it can also be an interface device which only acquires images taken by a device separate from the moving body detecting apparatus.

The area selecting unit 15 has a function to divide the static images from the camera 13 into an interior image of a vehicle and an exterior image thereof and stores them in the background image memory 17 and the present image memory 19. This area selecting unit 15 stores the contents of a monitoring region set in order to confirm as to whether an intruder is included in static images from the camera 13. In this embodiment, monitoring regions (see regions "201" and "203" in FIG. 2B) for monitoring window portions in the static images are set as "allowable areas" which permit a body to exist, while monitoring regions (see regions "202" and "204" in the same illustration) for monitoring door body portions in the static images are set as "unallowable areas" which do not permit a body to exist. In this case, the assistant driver's seat door window portion and the door body portion depend upon the positional relation in a height direction of the vehicle. For example, in the image, the region "201" forming the allowable area and the region "202" forming the unallowable area have a positional relationship in the vehicle height direction (the region "201" is positioned above the region "202"). Moreover, the assistant driver's seat door window portion and the rear seat left-hand door have a positional relationship in a longitudinal direction of the vehicle. For example, in the image, the region "201" and the region "203", forming the allowable areas, has a positional relationship in a longitudinal direction (the region "201" is positioned on the left side). In the description of this embodiment, the "vehicle height direction" of the vehicle will be referred to as a "vertical direction" in each image while the "longitudinal direction" of the vehicle will be referred as to a "horizontal direction" in each image. Moreover, each of the above-mentioned monitoring regions is set in the form of a point set such as bit map data.

The difference calculating unit 21 has a function to produce a difference image on the basis of a "background image" stored in the background image memory 17 and a "present image" stored in the present image memory 19 and to store the produced difference image in the difference image memory 23. Concretely, the difference calculating unit 21 reads out a background image (see FIG. 3A) from the background image memory 17 and a present image (see FIG. 3B) from the present image memory 19 to, with respect to each pixel, calculate the absolute value of a difference in luminance between both the images for producing a difference image in a state where the absolute value is used as a pixel value (see a pixel set "301" in FIG. 3C). The produced difference image is put in the difference image memory 23.

The binary conversion/labeling unit 25 has a function to implement various image processing including processing conversion into binary image data and labeling and store the resultant image in the binary conversion/labeling memory 27. The feature calculating unit 29 has a function to calculate a feature of each of pixel sets in an image stored in the binary conversion/labeling memory 27 and to store the calculation result, together with the image, in the feature calculation memory 31.

Figure 5A:
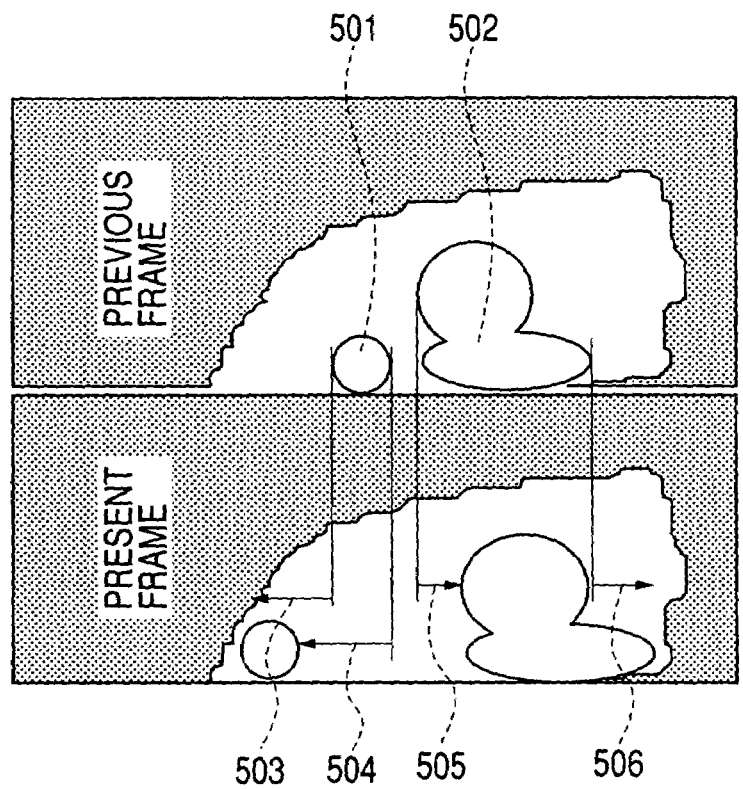
FIG. 5A is an illustration useful for explaining the processing for detecting a motion of a pixel set on the basis of two pixels continuing in time sequence.
Figure 5B:
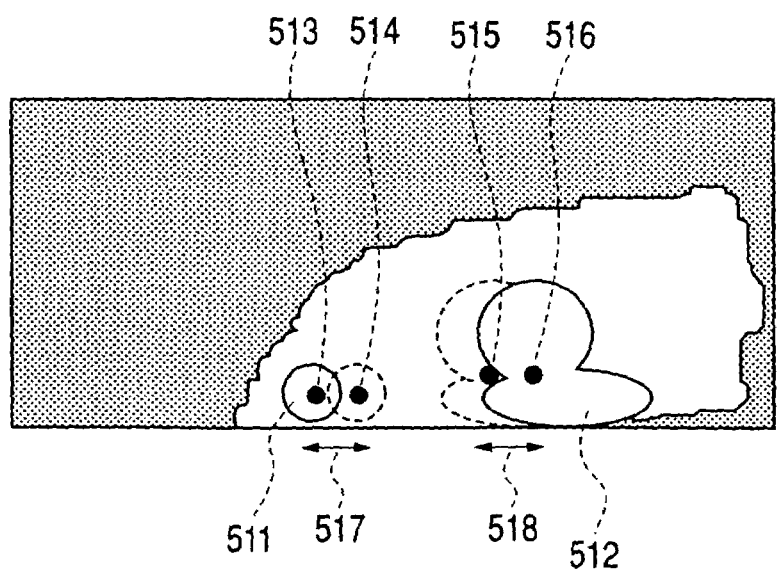
FIG. 5B is an illustration useful for explaining the processing for detecting a motion of a pixel set on the basis of two pixels continuing in time sequence.

The motion detecting unit 33 has a function to detect a motion of each of the pixel sets on the basis of the image and each pixel set feature stored in the feature calculation memory 31 and to store the detection result, together with the feature of the each of the pixel sets, in the motion detection memory 35. Concretely, the motion detecting unit 33 reads out two new images continuing in time sequence and the feature calculation results of image sets included in the respective images from the feature calculation memory 31. Then, as shown in FIG. 5A, on the basis of areas of the pixel sets, the motion detecting unit 33 makes a detection as to whether or not a pixel set existing in the old image (which will be referred to hereinafter as a "previous frame"; see FIG. 5A) of the aforesaid two images also exists in the new image (which will be referred to hereinafter as a "present frame"; see FIG. 5A) of the aforesaid two images. For example, in a case in which the object of detection is limited to the upper half of a thief or the like reflected in a window of the vehicle, the detection can be made on the basis of the area of the object. Moreover, if a pixel set is detected which exists in common to the previous frame and the present frame, the motion detecting unit 33 calculates, as a motion vector, a movement of the position of the center of gravity of the pixel set between the previous frame and the present frame. Incidentally, it is also appropriate that the two movements of the position of the center of gravity are indicated by distances in X and Y directions. As one example, as shown in FIG. 5B, if a pixel set "511" moves from a position indicated by a dotted line to a position indicated by a solid line, the center of gravity "514" in the previous frame moves to the center of gravity "513" in the present frame. The moving amount of the center of gravity at this time is indicated by the length of an arrow "517". Moreover, this also applied to a pixel set "512". Lastly, the information indicative of the motion vector, together with the image and the pixel set feature, is stored in the motion detection memory 35.

The recognizing unit 37 has a function to, on the basis of the image and the feature/motion of each of the pixel sets stored in the motion detection memory 35, recognize whether or not a moving body exists in a pixel set. Concretely, the recognizing unit 37 reads out the image and the information indicative of the feature/motion of the pixel set from the motion detection memory 35. Subsequently, on the basis of the images and various information, the recognizing unit 37 makes a decision as to whether a pixel set satisfying all the following conditions (1) to (3) exists or not, thereby making a decision as to whether an intruder breaking from the exterior of a vehicle into the interior of the vehicle exists or not.

Condition (1): in monitoring regions (the monitoring regions "201" and "203" in FIG. 2B), if the following two conditions (1-1) and (1-2) are simultaneously satisfied, a decision is made that the upper half of a thief is reflected in a window portion of a vehicle.

the area of a pixel set>a first threshold (1-1)

the length of a motion vector<a second threshold (1-2)

The first threshold corresponds to an area of a pixel set determined to detect the upper half of a thief reflected in a window portion of a vehicle and is prescribed in advance through experiments or the like. The second threshold corresponds to a length of vector set to detect a motion of the upper half of a thief which stops in the vicinity of the vehicle and appears in a window portion of the vehicle but set so as not to detect the upper half of a passer reflected in the window portion of the vehicle and is prescribed in advance through experiments or the like.

Condition (2): in monitoring regions (the monitoring regions "202" and "204" in FIG. 2B), if the following two conditions (2-1) and (2-2) are satisfied, a decision is made that an arm of a thief or the like comes from a window portion of a vehicle to a door body portion thereof.

the area of a pixel set>a third threshold (2-1)

the direction of a motion vector is downward (2-2)

The third threshold corresponds to an area of a pixel set determined to detect a hand or an arm of a thief reflected in the door body portion of the vehicle and is prescribed in advance through experiments or the like.

Condition (3): When a pixel set in the exterior of the vehicle and a pixel set in the interior thereof overlap with each other in a horizontal direction, a decision is made that the pixel set residing in the exterior of the vehicle and the pixel set residing in the interior thereof are integral with each other.

Figure 6:
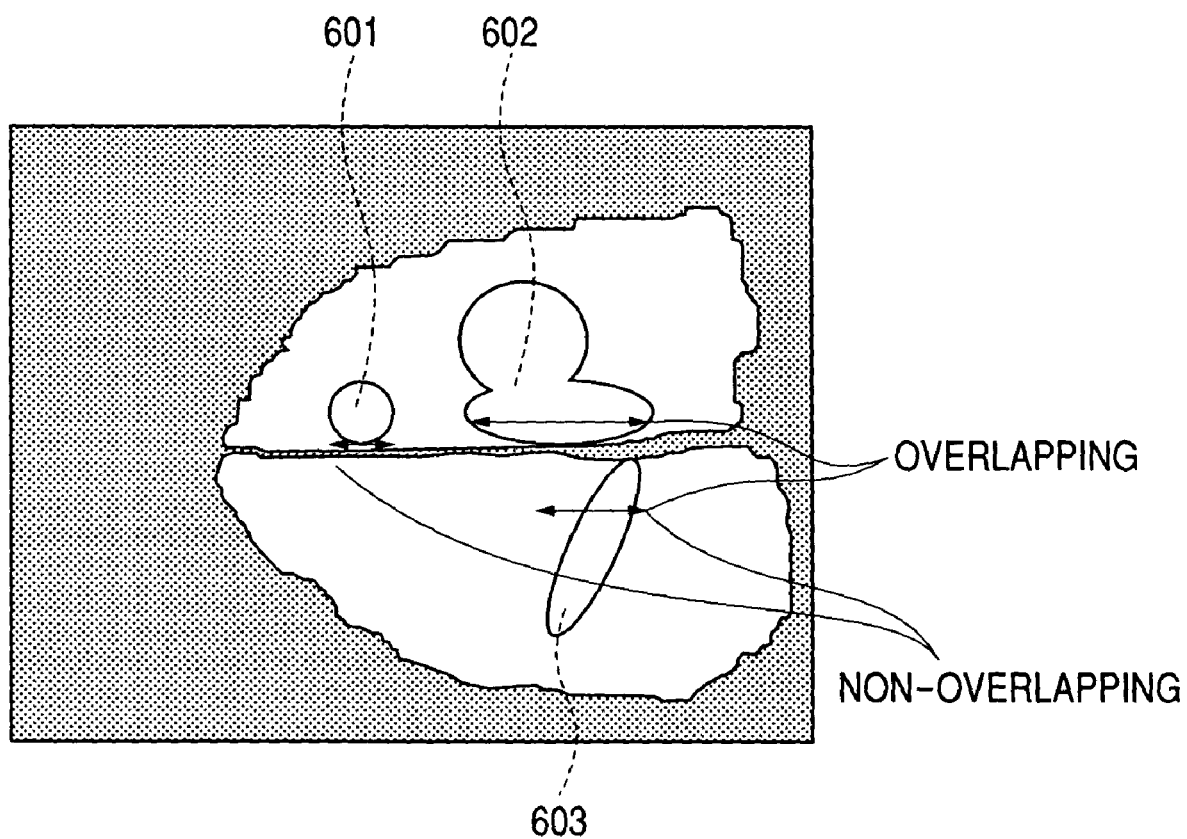
FIG. 6 is an illustration useful for explaining decision processing to be conducted in a recognizing unit.

Explaining with reference to FIG. 6, in a case in which each of pixel sets "601", "602" and "603" satisfies the above-mentioned conditions (1) and (2), the width (see an arrow) of the pixel set "601" in a horizontal direction and the width (see an arrow) of the pixel set "603" in the horizontal direction do not overlap with each other as the positional relationship in the horizontal direction. On the other hand, the width (see an arrow of the pixel set "602" in the horizontal direction and the width of the pixel set "603" in the horizontal direction overlap with each other as the positional relationship in the horizontal direction.

The speaker 41 is composed of a horn or the like and has a function to issue an alarm sound for notifying the existence of an intruder from the exterior of the vehicle to the interior thereof to a passenger such as a driver and to issue a warning sound to the body existing continuously in the monitoring region, which is set to monitor the exterior of the vehicle, for a predetermined period of time.

(Configuration of Each of Memories)

The background image memory 17 is a memory for storing an image (background image) including no moving body forming an object of detection. This background image can be an image picked up by the camera 13 immediately after the power-on in the moving body detecting apparatus 11, or it can also be, of the images taken by the camera 13 immediately after the power-on, an image selected periodically as an image which does not vary in time sequence. Moreover, an image taken in advance through an manipulation by a user is also acceptable.

The present image memory 19 is for storing the present image. The difference image memory 23 is for storing a difference image, and the binary conversion/labeling memory 27 is for storing an image which has undergone conversion-into-binary and labeling processing. Moreover, the feature calculation memory 31 is for storing an image which has undergone the feature calculation, and the motion detection memory 35 is for storing an image which has undergone the motion detection. Each of these memories is internally divided into a region (which will be referred to hereinafter as a "vehicle interior region") for storing an interior portion including a door portion of a background image or a present image and a region (which will be referred to hereinafter as a "vehicle exterior region") for storing an exterior portion including a window portion of a background image or a present image.

(Description of Control Unit 39]

The control unit 39 has a function to generally control the area selecting unit 15, the difference calculating unit 21, the binary conversion/labeling unit 25, the feature calculating unit 29, the motion detecting unit 33 and the recognizing unit 37.

In this embodiment, the camera 13 corresponds to the image acquiring means, and area selecting unit 15, the difference calculating unit 21, the binary conversion/labeling unit 25, the feature calculating unit 29, the motion detecting unit 33, the recognizing unit 37 and the control unit 39 correspond to the decision processing means, and the speaker 41 corresponds to the notifying means and the warning means.

(Description of Decision Processing)

Figure 7:
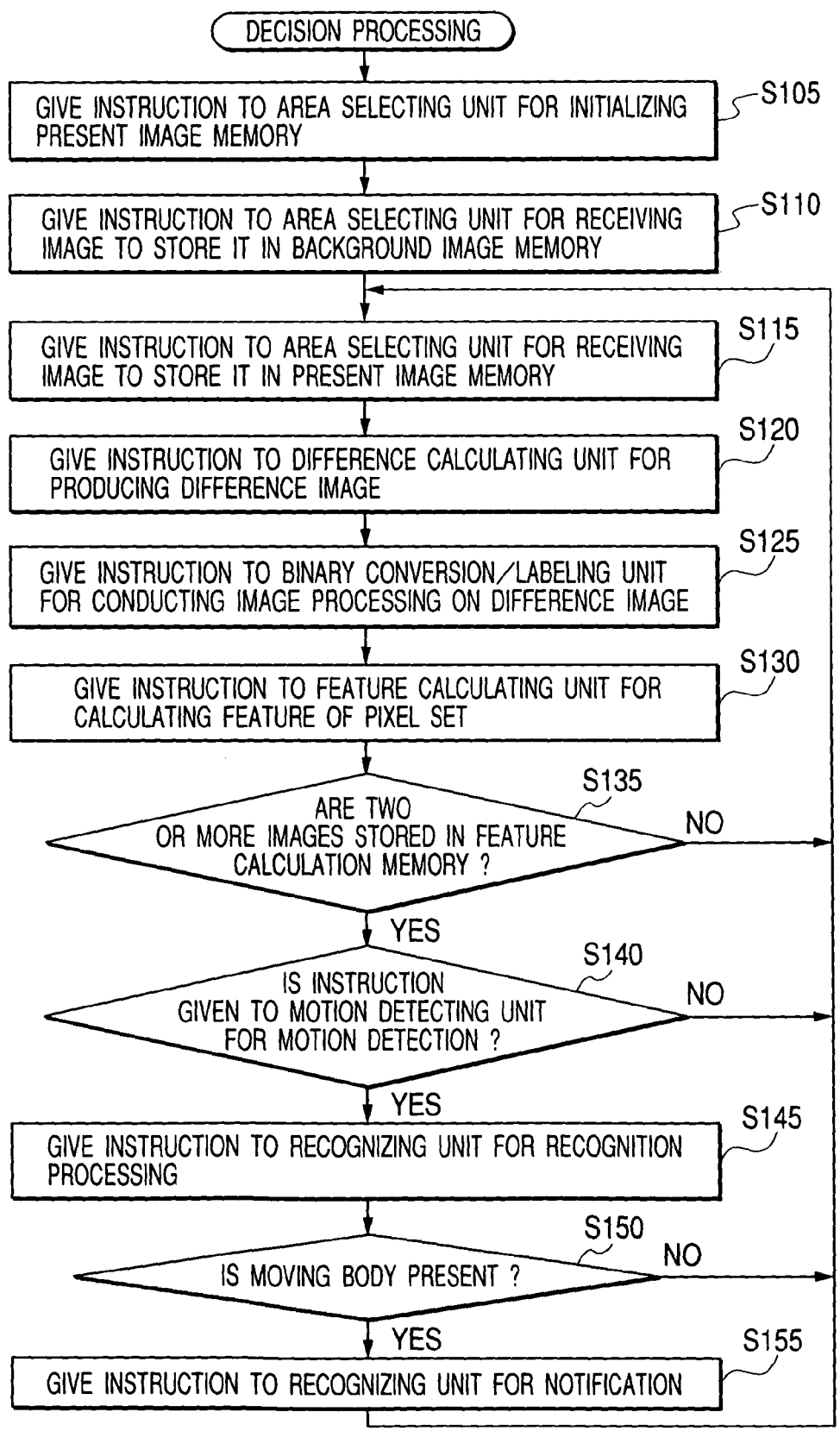
FIG. 7 is a flow chart showing decision processing according to the first embodiment.

Referring to a flow chart of FIG. 7, a description will be given hereinbelow of the decision processing to be implemented in the control unit 39. The implementation of this decision processing starts in response to the power-on in the moving body detecting apparatus 11.

First of all, in S105 (step 105), an instruction is given to the area selecting unit 15 for initializing the background memory 17 and the present image memory 19. Upon receipt of this instruction, the area selecting unit 15 initializes the background memory 17 and the present image memory 19. After the completion of the initialization, the area selecting unit 15 makes a reply on the fact of the initialization completion to the control unit 39, and upon receipt of this reply, the control unit 39 executes the following steps. Although the description will be omitted in the following steps, as with this step, when receiving various types of instructions, each of the units (the area selecting unit 15, and others) makes a replay on the completion of that instruction to the control unit 39, and upon receipt of the replay, the control unit 39 executes the following steps.

Figure 2B:
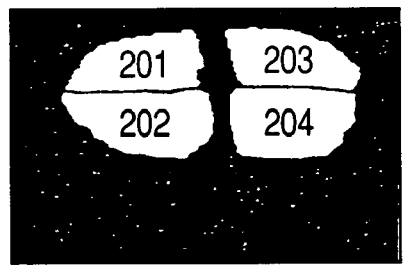
FIG. 2B is an illustration useful for explaining a monitoring range to be set in a static image.

In the next S110, an instruction is given to the area selecting unit 15 for receiving static images from the camera 13 and storing them in the background image memory 17. In response to this instruction, the area selecting unit 15 puts the following background images in the background image memory 17. That is, when receiving the static images of the assistant driver's seat/rear seat door portion/window portion in a vehicle from the camera 13 as shown in FIG. 2A, the area selecting unit 15 encodes the pixel signals of portions corresponding to monitoring regions in the static images with a numerical value "1" (portions indicated by white color) and encodes the pixel signals of the other areas with a numerical value "0" (portions indicated by black color), as shown in FIG. 2B. Then, the area selecting unit 15 calculates two-dimensional coordinates of the pixel signals encoded with the numerical value "1" and makes judgment on the position of each of the pixel signals in the vehicle interior area or the vehicle exterior area. Moreover, the area selecting unit 15 stores, as a background image, each of the pixel signals in the relevant one of the vehicle interior area and vehicle exterior area of the background image memory 17.

Subsequently, in S115, an instruction is given to the area selecting unit 15 for receiving a static image from the camera 15 to store it as the present image in the present image memory 19. Upon receipt of this instruction, the area selecting unit 15 stores the following present image in the present image memory 19. That is, when receiving a static image from the camera 13, the area selecting unit 15 calculates two-dimensional coordinates of each of pixel signals without encoding each of the pixel signals of the static image, and makes judgment on the position of each of the pixel signals in the vehicle interior area or the vehicle exterior area to put it as the present image in the relevant one of the vehicle interior area and the vehicle exterior area of the present image memory 19. Although the description will be omitted in the following steps, as with this step, when receiving various types of instructions, each of the units (the area selecting unit 15, and others) reads out an image from the corresponding memory and stores an image in the corresponding memory according to the selection between vehicle interior area and the vehicle exterior area.

Following this, in S120, an instruction is given to the difference calculating unit 21 for producing a difference image. Upon receipt of this instruction, with respect to each of pixels, the difference calculating unit 21 calculates the absolute value of the difference in luminance value between a background image (see FIG. 4A) stored in the background image memory 17 and a present image (see FIG. 4B) stored in the present image memory 19 and produces a difference image in a manner such that this value is used as a pixel value. The produced difference image is put in the difference image memory 23.

In S125, an instruction is given to the binary conversion/labeling unit 25 for conducting the image processing on the difference image. Upon receipt of this instruction, the binary conversion/labeling unit 25 first converts the difference image, stored in the difference image memory 23, into binary image data according to luminance value. In this case, the "luminance value" signifies a simple brightness in the case of a monochrome image and, in the case of a color image, signifies an independent luminance value of each of RGB colors or the result luminance value of the three colors. Moreover, each of sets of pixel signals, expressed by the same value, is labeled (the pixel sets "401" to "403" in FIG. 4C). The image labeled for each pixel set is stored in the binary conversion/labeling memory 27.

In S130, an instruction for the calculation of a feature of each of the pixel sets is given to the feature calculating unit 29. Upon receipt of this instruction, the feature calculating unit 29 first reads out an image from the binary conversion/labeling memory 27 and then calculates the area, center of gravity and average luminance of each of the pixel sets in the image read out therefrom. Moreover, the feature calculating unit 29 calculates the coordinates of a upper left corner and lower right corner of an external-shape rectangular configuration of the pixel set. These calculation results, together with the image, are stored in the feature calculation memory 31.

In S135, a decision is made as to whether or not two or more images different in time sequence are stored in the feature calculation memory 31. If two or more images different in time sequence are not stored in the feature calculation memory 31 (S135: NO), the operational flow returns to S115 to implement the steps S115 to S130 repeatedly. Incidentally, in a case in which the operational flow returns to S115 to repeat S115 to S130, the older one of the images stored in each of the memories other than the background image memory 17 can be deleted. On the other hand, if two or more images different in time sequence are stored in the feature calculation memory 31 (S135: YES), the operational flow advances to S140.

In S140, an instruction is given to the motion detecting unit 33 for detecting a motion of pixel sets of the image. In response to this instruction, the motion detecting unit 33 first reads out two images continuing in time sequence and a feature calculation result of a pixel set included in each of the images from the feature calculation memory 31 and then, on the basis of the area of a pixel set, detects whether or not a pixel set residing in the previous frame also exists in the present frame. If a pixel set residing in common to the previous frame and the present frame is not detected (S140: NO), the operational flow returns to S115 to conduct S115 to S130 repeatedly.

On the other hand, in the case of the detection of a pixel set residing in both the previous frame and present frame (S140: YES), the movement of the position of the center of gravity of the pixel set between the previous frame and the present frame is calculated as a "motion vector". Lastly, information indicative of this motion vector, together with the image and the information representative of the feature of the image set, is stored in the motion detection memory 35.

In S145, an instruction is given to the recognizing unit 37 for implementing the recognition processing. In response to this instruction, the recognizing unit 37 reads out the image and the information indicative of the feature and motion of the pixel set from the motion detection memory 35 and, on the basis of these information, makes decision as to whether or not there is a pixel set satisfying all the above-mentioned conditions (1) to (3), thereby making a decision as to whether an intruder from the exterior of the vehicle to the interior thereof exists or not, with this decision result being sent as a reply to the control unit 39.

The operational flow from S150 depends on the decision result in the recognizing unit 37. That is, if the decision result indicates that an intruder from the exterior of the vehicle to the interior thereof exists, the operational flow goes to S155. On the other hand, if the decision result indicates that an intruder from the exterior of the vehicle to the interior thereof does not exist, the operational flow returns to S115 to repeat S115 to S130.

In S155, a signal is sent to the speaker 41 to ring a horn for a predetermined (constant) period of time (for example, 1 minute). Other manners, such as lighting a lamp or sounding a siren or buzzer, are also acceptable. After the elapse of the predetermined period of time, the sending of a signal to the speaker 41 comes to a stop, and the operational flow returns to A115. This decision processing is repeatedly conducted until the power supply of the moving body detecting apparatus 11 is cut off.

As described above, the moving body detecting apparatus 11 detects, as an intruder, only a pixel set moving from a monitoring region in the exterior of a vehicle to a monitoring region in the interior thereof and, hence, can detect only a body to be notified without detecting an object similar in feature to the body to be notified, such as a passer with respect to a thief.

Figure 8:
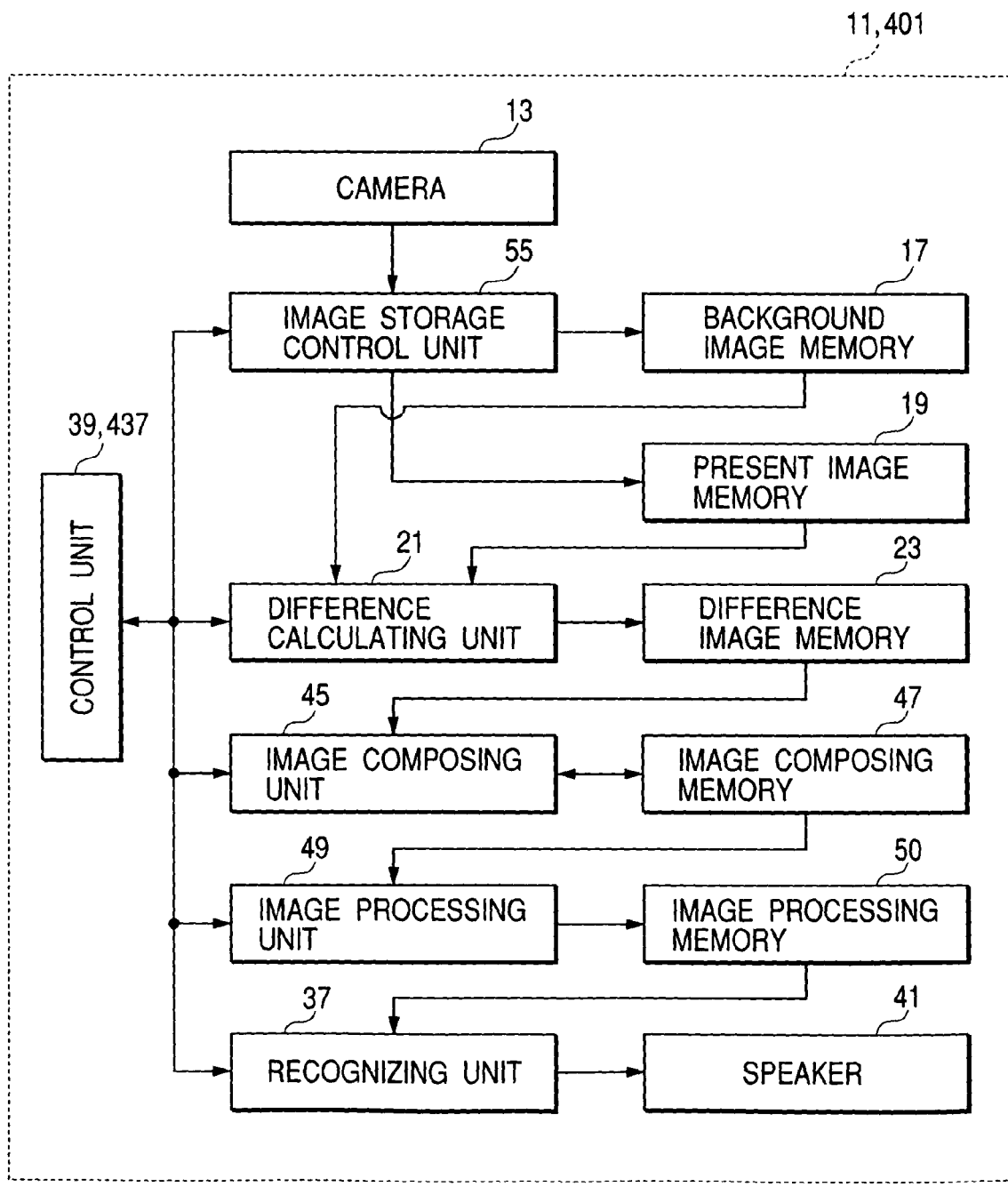
FIG. 8 is a block diagram showing another internal configuration of the moving body detecting apparatus according to the first embodiment.

FIG. 8 is a block diagram showing another internal configuration of the moving body detecting apparatus 11 according to the first embodiment of the present invention. This moving body detecting apparatus 11 is mounted in a vehicle and functions as an antitheft apparatus. The same reference numerals represent the same or corresponding parts, and the detailed description will be omitted for brevity. As FIG. 8 shows, this moving body detecting apparatus 11 is made up of a camera 13, an image storage control unit 55, a difference calculating unit 21, an image composing unit 45, an image processing unit 49, a recognizing unit 37, a control unit 39, a background image memory 17, a difference image memory 23, an image composing memory 47, an image processing memory 50, and a speaker 41. As mentioned above, of these components, each of the image storage control unit 55, the difference calculating unit 21, the image composing unit 45, the image processing unit 49, the recognizing unit 37 and the control unit 39 is constructed as an electronic circuit comprising a CPU, a ROM, a RAM and others. The background image memory 17, the present image memory 19, the difference image memory 23, the image composing memory 47 and the image processing memory 50 are constructed using a semiconductor memory such as DRAM or ADRAM. Each of these memories can individually be constructed with a semiconductor memory, or all of these memories can also be constructed with one or plural semiconductor memories.

The camera 13 is attached to a central portion of a ceiling in the interior of a vehicle, the image storage control unit 55 has a function to acquire static images from the camera 13 and to store them in the background memory 17 or the present image memory 19. The difference calculating unit 21 reads out images from the background image memory 17 and the present image memory to produce a difference image and put it in the difference image memory 23. The image composing unit 45 reads out a difference image from the difference image memory 23 to process it with a composite image stored in the image composing memory 47, and then stores the processed image in the image composing memory 47.

The image processing unit 49 reads out a composite image from the image composing memory 47 to conduct various image processing thereon and then stores the resultant image in the image processing memory 50. The recognizing unit 37 recognizes whether or not a moving body exists in the image stored in the image processing memory 50.

The image composing memory 47 is for storing a composite image, and the image processing memory 50 is for storing an image which has undergone image processing.

The control unit 39 has a function to generally control the image storage control unit 55, the difference calculating unit 21, the image composing unit 45, the image processing unit 49 and the recognizing unit 37. The camera 13 corresponds to the image acquiring means, and the image storage control unit 55, the difference calculating unit 21, the image composing unit 45, the image processing unit 49, the recognizing unit 37 and the control unit 39 correspond to the decision means, and the speaker 41 corresponds to the notifying means.

Secondly, referring to a flow chart of FIG. 9, a description will be given hereinbelow of the decision processing to be implemented in the control unit 39. The implementation of this decision processing starts in response to the power-on of the moving body detecting apparatus 11.

First of all, in S210, an instruction is given to the image storage control unit 55 for initializing the present image memory 19. Upon receipt of this instruction, the image storage control unit 55 initializes the present image memory 19. The image storage control unit 55 makes a reply on the completion of the initialization to the control unit 39, and in response to this reply, the control unit 39 implements the following steps. Although the description will be omitted in the following steps, as with this step, when receiving various types of instructions, each of the units (the image storage control unit 55, and others) makes a reply on the completion of the instruction to the control unit 39 and, upon receipt of the replay, the control unit 39 executes the following steps.

In S215, an instruction is given to the image storage control unit 55 for receiving static images from the camera 13 to store them in the present image memory 19. Upon receipt of this instruction, the image storage control unit 55 receives static images from the camera 13 and stores them in the present image memory 19.

In S220, an instruction is given to the difference calculating unit 21 for producing a difference image. In response to this instruction, with respect to each pixel, the difference calculating unit 21 calculates the absolute value of a difference in luminance value between a background image stored in the background image memory 17 and a static image stored in the present image memory 19 to produce a difference image in a manner such that the calculated value is used as a pixel value, with the produced difference image being stored in the difference image memory 23.

In S223, an instruction is given to the image composing unit 45 for initializing the image composing memory 47. Upon receipt of this instruction, the image composing unit 45 initializes the image composing memory 47.

In S225, an instruction is given to the image composing unit 45 for transferring the difference image to the image composing memory 47. In response to this instruction, the image composing unit 45 reads out the difference image from the difference image memory 23 and stores it as a composite image in the image composing memory 47. This composite image is identical to the difference image.

In S230, an instruction is given to the image storage control unit 55 for the initialization of the present image memory 19. This step is the same as the above-mentioned S210.

In S235, an instruction is given to the image storage control unit 55 for receiving a static image from the camera 13 and for storing it in the present image memory 19. The processing in this step is the same as that in S215.

In S240, an instruction is given to the difference calculating unit 21 for producing a difference image. The processing in this step is the same as that in S220.

In S245, an instruction is given so that the value of a counter to be used for the decision in S250, which will be mentioned later, is incremented by 1 and the image composing unit 45 carries out the image composing. Upon receipt of this instruction, the image composing unit 45 reads out a difference image from the difference image memory 23 by one pixel and a composite image from the image composing memory 47 by one pixel to make a comparison between the read-out pixel values. If the pixel value of the difference image is higher, the pixel value stored in the image composing memory 47 is renewed with the pixel value of the difference image. On the other hand, if the pixel value of the difference image is lower, nothing is done. This processing is conducted with respect to all the pixels thereof.

In S250, on the basis of the value of the counter, a decision is made as to whether or not the image composing instruction to the image composing unit 45 in S245 has been given four times. If the image composing instruction has been made four times, the value of the counter is set at zero, and the operational flow advances to S255. On the other hand, if the image composing instruction does not reach four times, the operational flow returns to S230.

In S255, an instruction is given to the image processing unit 49 for conducting image processing. Upon receipt of this instruction, the image processing unit 49 reads out a composite image from the image composing memory 47 and conducts various image processing such as binary conversion and labeling to be implemented before image recognition and stores it in the image processing memory 50.

In S260, an instruction is given to the recognizing unit 37 for the recognition processing. Upon receipt of this instruction, the recognizing unit 37 reads out an image from the image processing memory 50 to make a decision as to whether or not a moving body exists in that image, and returns the decision result to the control unit 39. This decision is made in consideration of a shape, area or the like of pixel set.

According to a decision result in S265, that is, according to the decision result in the recognizing unit 37 in S260, the operational flow advances to different ways. If the decision result shows the existence of a moving body, the operational flow advances to S270. On the other hand, if it shows no existence of a moving body, the operational flow returns to S210.

In S270, a signal is sent to the speaker 41 to sound a siren for a predetermined period of time (for example, 1 minute). After the elapse of the predetermined period of time, the sending of the signal to the speaker 41 comes to a stop, and the operational flow returns to S210. In this way, the decision processing is repeatedly conducted until the power supply to the moving body detecting apparatus 11 is cut off.

In addition, a description will be given hereinbelow of the concrete example of the above-mentioned decision processing.

Figures 10A, 10B:
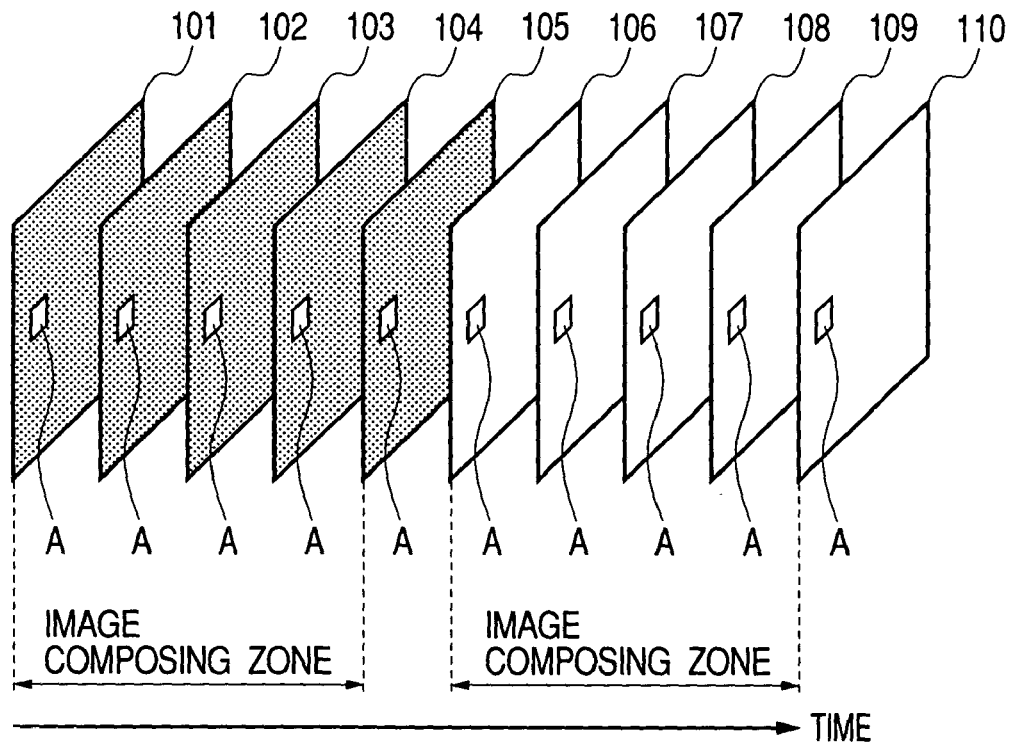
FIGS. 10A and 10B are illustrations for explaining the decision processing.

FIG. 10A shows images 101 to 110 forming difference images produced from static images taken by the camera 13 and a background image. These difference images 101 to 110 are arranged from the left side to the right side to continue in time sequence. FIG. 10B is a table showing pixel values of pixels A of the images 101 to 110.

Figure 9:
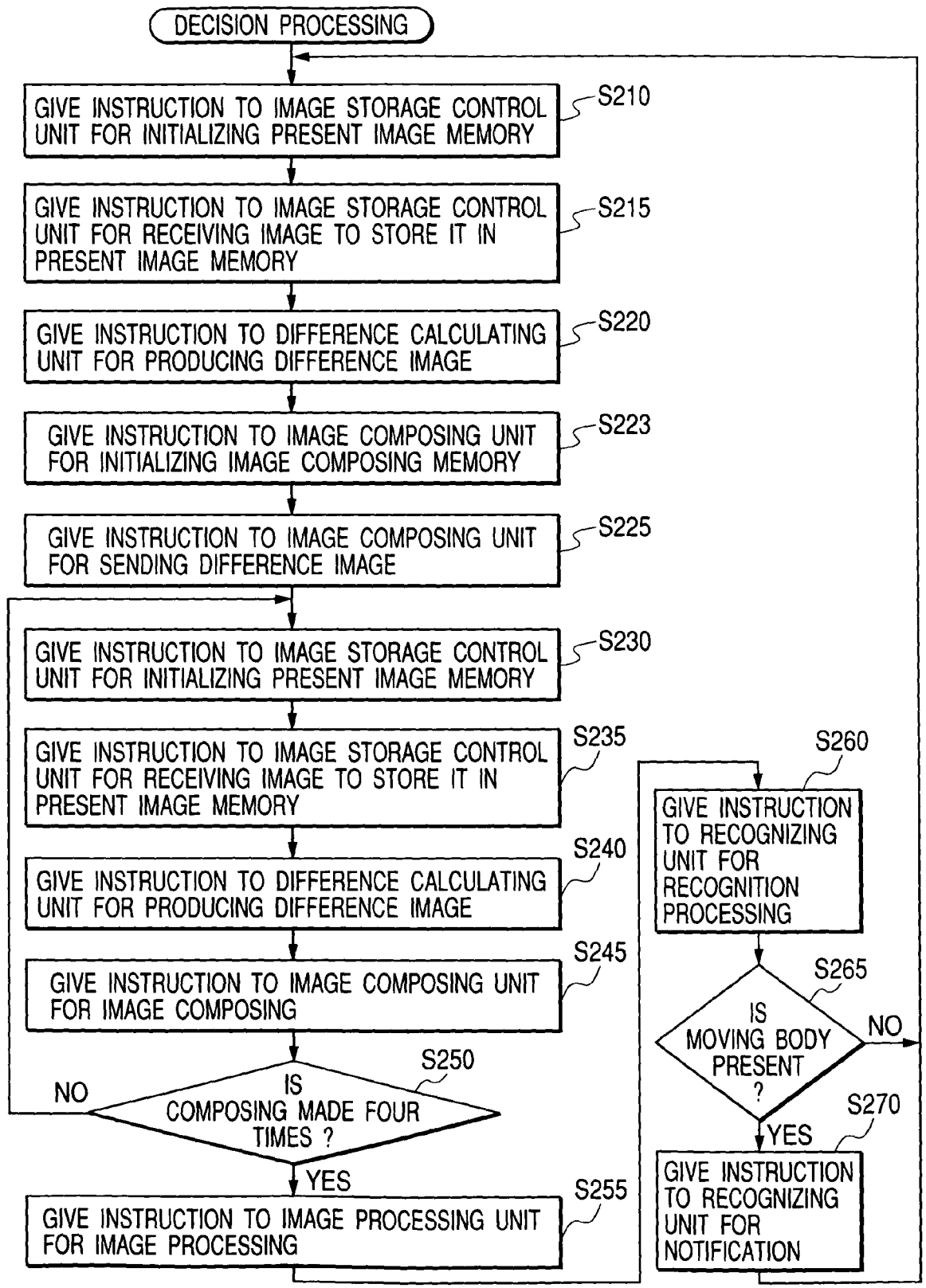
FIG. 9 is a flow chart useful for explaining decision processing to be implemented.

First, the images 101 to 105 successively undergo image composing processing to produce a composite image (see S211 to S250 in FIG. 9). This image composing is successively done in a manner such that, with respect to each pixel, a pixel value are compared with another pixel value to select the higher pixel value. Concretely, noting the pixels A in the images 101 to 105, as the pixel value of the pixel A of a composite image obtained from these five images, the pixel value "98" of the image 104 is at a maximum as shown in FIG. 10B and, hence, this highest value "98" is selected.

The image composing is made on the images 101 to 105 and the resultant composite image undergoes the image processing (see S255 in FIG. 9) and the recognition processing (see S260 in FIG. 9). After the completion of these processing, the image composing is newly made with respect to the images 106 to 110.

Figure 11:
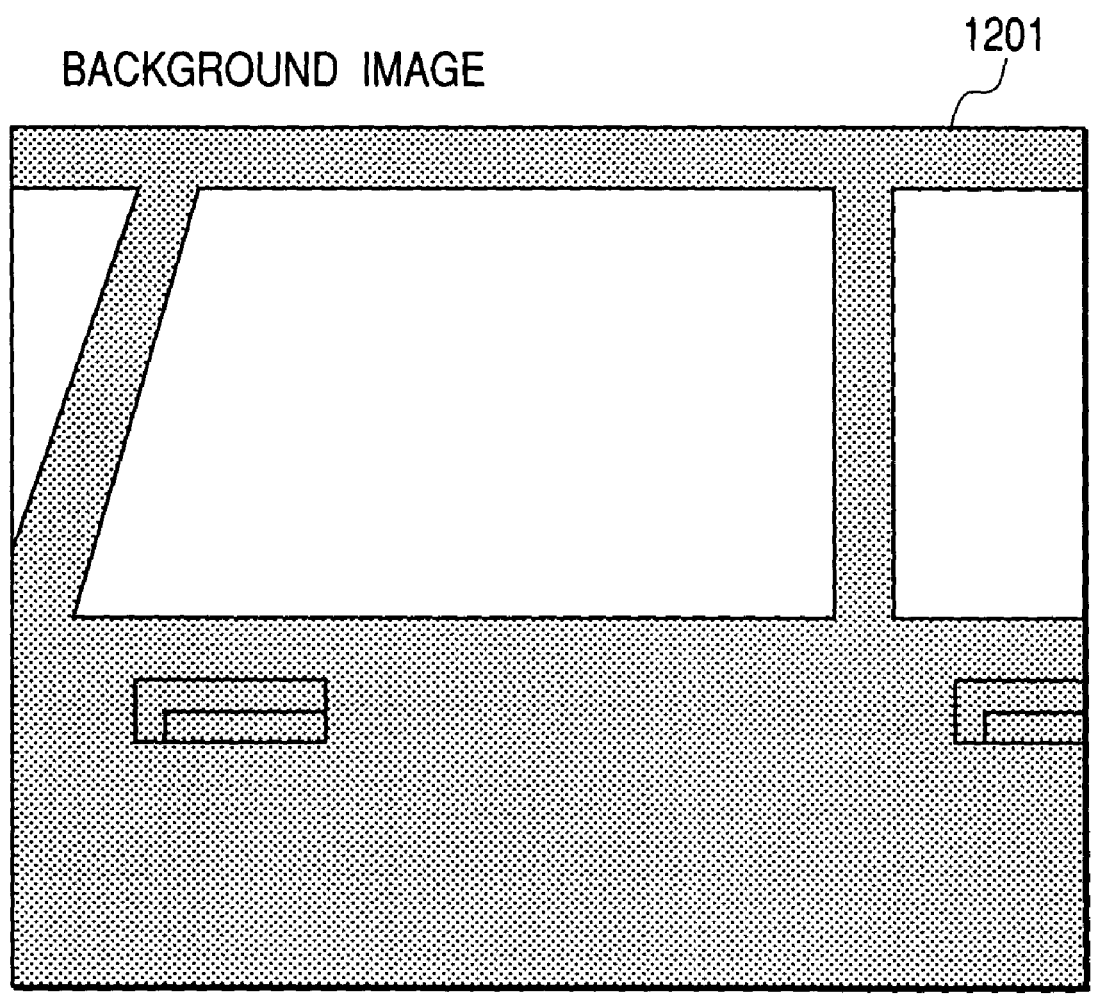
FIG. 11 is an illustration of a background image for explaining the decision processing.
Figure 12A:
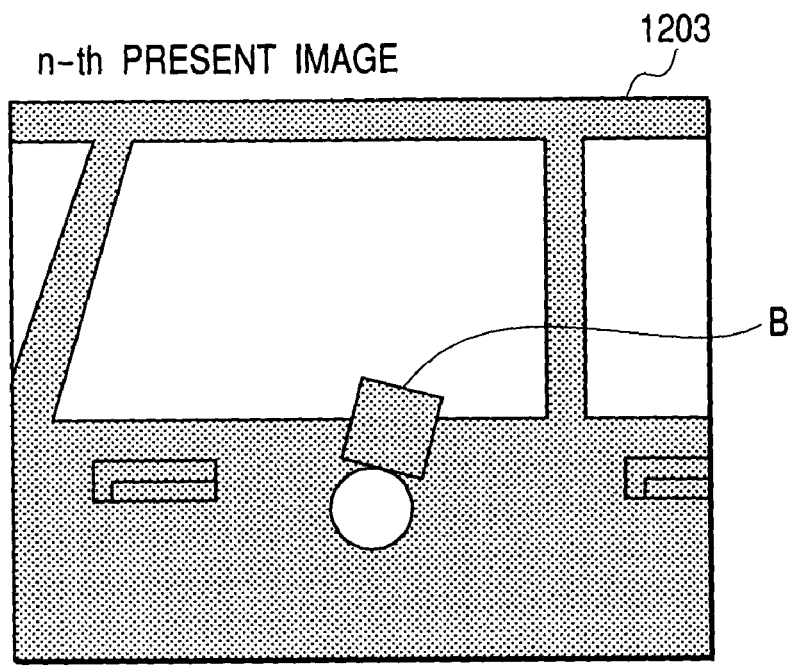
FIGS. 12A and 12B are illustrations of present images for explaining the decision processing.
Figure 12B:
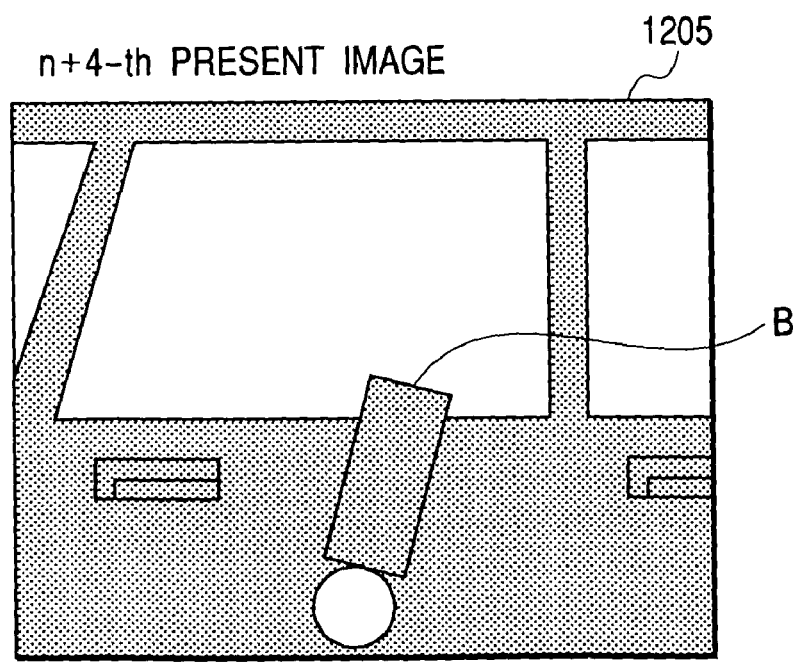
Figure 13A:
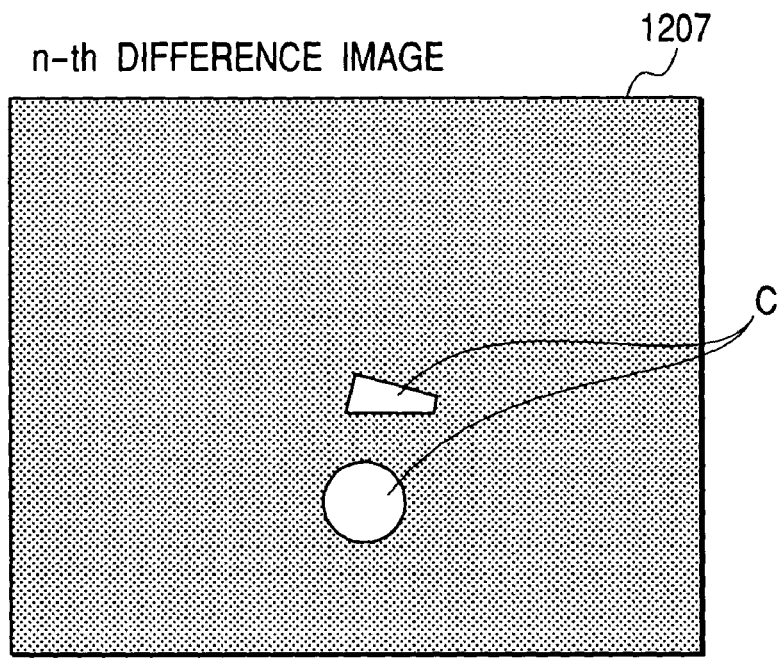
FIGS. 13A and 13B are illustrations of difference images for explaining the decision processing.
Figure 13B:
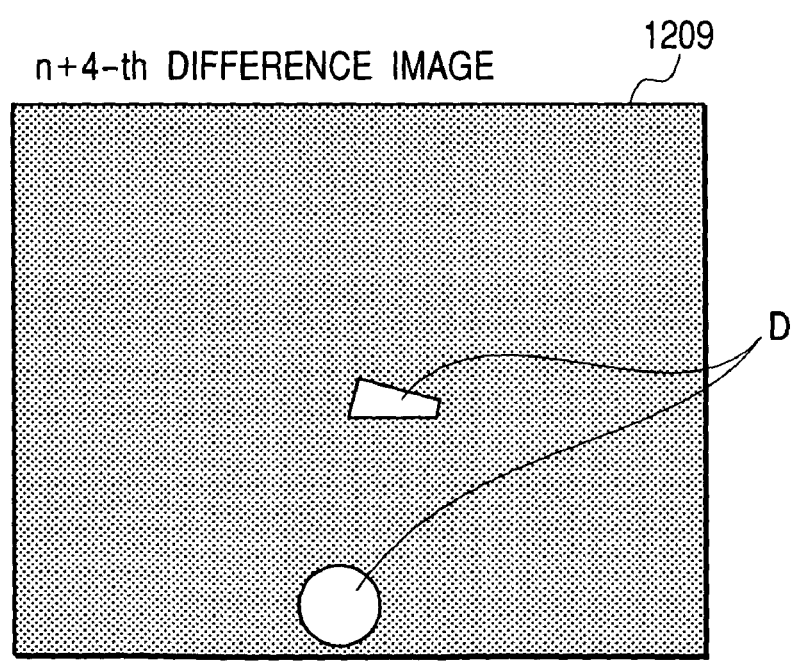

FIG. 11 is an illustration of a background image 1201 showing a driver's seat side door and its vicinity. FIG. 12A is an illustration of an n-th present image 1203, showing a state in which an arm B breaks in the interior of a vehicle. FIG. 12B is an illustration of an n+4-th present image 1205, showing a state in which the arm B enters a lower portion of the interior of the vehicle. FIG. 13A is an illustration of a difference image 1207 produced from the background image 1201 shown in FIG. 11 and the n-th present image 1203 shown in FIG. 12A, showing pixel sets C different in luminance value from the background image 1201. FIG. 13B is an illustration of a difference image 1209 produced from the background image shown in FIG. 11 and the n+4-th present image 1205 shown in FIG. 12B, showing pixel sets D different in luminance value from the background image 1201.

Figure 14:
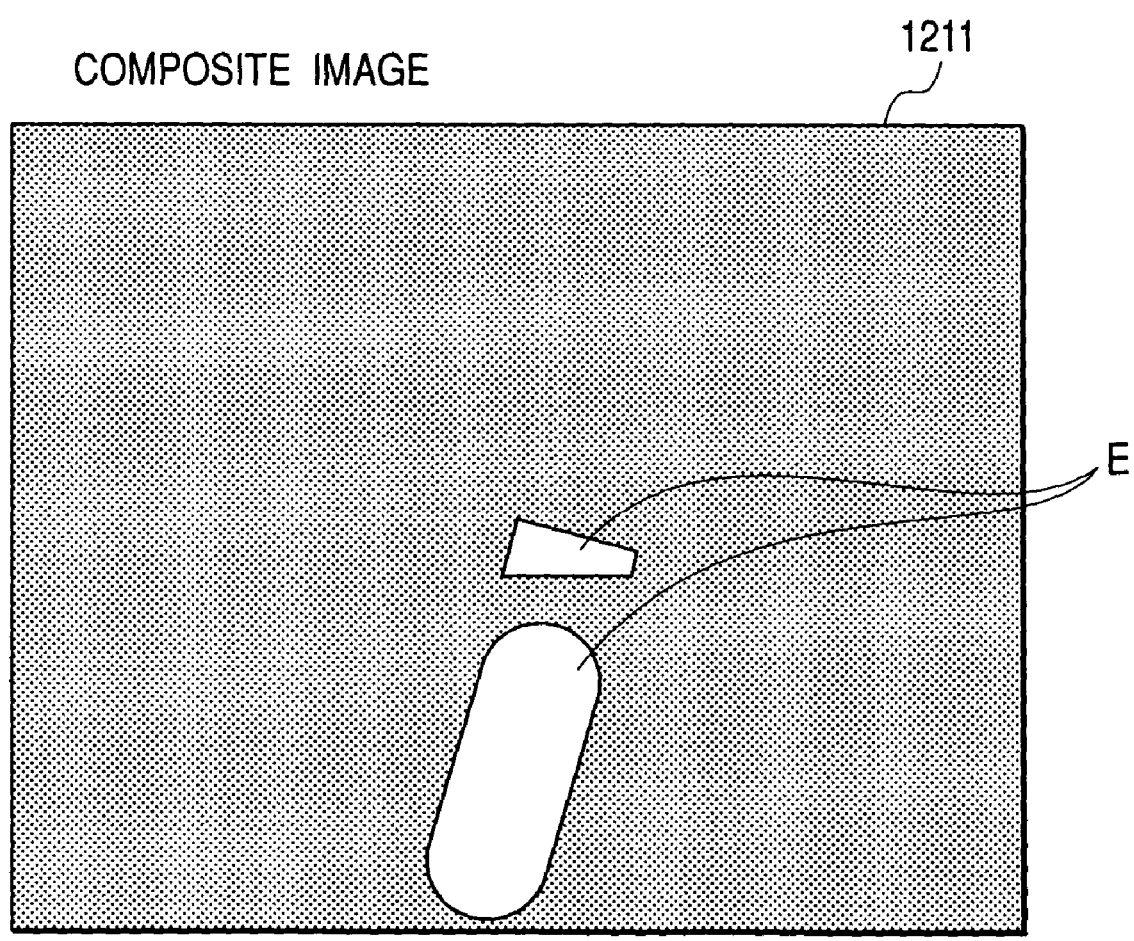
FIG. 14 is an illustration of a composite image for explaining the decision processing.

FIG. 14 is an illustration of a composite image 1211 obtained from the n-th difference image 1207 shown in FIG. 13A, the n+1-th, n+2-th and n+3-th difference images (not shown) and the n+4-th difference image 1209 shown in FIG. 13B. As obvious from this illustration, pixel sets E have a larger area as compared with the pixel sets C shown in FIG. 13A and the pixel sets D shown in FIG. 13B.

Thus, the moving body detecting apparatus 11 makes a decision on the existence of a moving body through the use of a composite image in which a movement trajectory of the body appears. This enables the detection of a small moving body with extremely higher accuracy than that of a conventional technique.

Moreover, since a difference image is produced by calculating the absolute value of the difference in luminance value between a present image taken by the camera 13 and a background image stored in advance and a composite image is produced using that difference image, even if a moving body has a lower luminance as compared with a background image, the moving body is detectable with high accuracy.

As described above, according to this embodiment, in the moving body detecting apparatus, the image acquiring means acquires static images continuing in time sequence within the same monitoring range, and the decision processing means receives the static images from the image acquiring means to produce a composite image by successively conducting the image composing on the static images so that each pixel has the highest luminance value and, when the number of static images used for the image composing reaches a predetermined value, makes a decision as to whether or not a moving body exists in the composite image. The image acquiring means is realizable through the use of a photographing (imaging) device such as a camera, or it is also realizable with an interface device which merely obtains images picked up by a device separate from the moving body detecting apparatus. The "luminance value" may signify a simple brightness in the case of a monochrome image and, in the case of a color image, may signify an independent luminance value of each of RGB colors or the result luminance value of the three colors.

In a conventional technique, a background image including no moving body and a static image picked up are compared one by one to detect signs of a moving body and this detection processing is conducted with respect to a plurality of static images to track the positions of the signs of a moving body in the static images for making a decision as to whether or not it is a moving body. Therefore, in a case in which a moving body is relatively small in the entire static image, the conventional technique can result in misjudgment. On the other hand, according to the above-described embodiment, prior to the detection of a body, the decision processing means conducts the image composing on the static images so that each pixel has the highest luminance value, and detects a moving body using one composite image. A movement trajectory of a moving body appears in the composite image and the moving body appears in a state made larger than the original size of the moving body. Therefore, the moving body detecting apparatus according to this embodiment can detect, with extremely high accuracy, a moving body which can fall into a background like a small moving body.

Meanwhile, in a case in which a moving body has a lower luminance as compared with that of a background, when a composite image is produced by conflating a plurality of static images, a moving body can fall into a background. For example, in the case of a monochrome image, when the luminance value of the background is high and the luminance value of the moving body is low, even if the moving body exists at a given pixel, the luminance value of the background achieves domination over the luminance value of the moving body when the moving body moves and, hence, the moving body can disappear as a result. Therefore, in a case in which the detection of a moving body takes place in such a situation, the decision processing means receives static images from the image acquiring means and calculates an absolute value of the difference in luminance value between each of a plurality of static images from the image acquiring means and the background image stored in advance for each pixel to produce a difference image, and through the use of the difference images, a composite image is produced by the successive image composing so that each pixel has the highest absolute value, and when the number of difference images used for the image composing reaches a predetermined value, a decision is made as to whether or not a body moving exists in the composite image. The "background image" signifies an image in which a moving body is absent.

This difference image is produced by calculating the absolute value of the difference in luminance value between a static image received from the image acquiring means and a background image stored in advance and, hence, the difference image does not represent the comparison result in magnitude of luminance between both the images but signifying the comparison result in the difference of luminance therebetween. Therefore, this eliminates the above-mentioned problem of a moving body being broken because the background luminance value is high, thereby enabling high-accuracy detection of a moving body.

Furthermore, as the implementation timing of the decision processing, it is considered that the decision processing is simply conducted repeatedly without particularly paying attention to timing. In this case, it is realizable with a simple arrangement, and since all the static images picked up can be put to use without being abandoned, the reliability of the moving body detection is improvable.

Furthermore, although the decision processing means can carry out the image composing using all the static images from the image acquiring means, it is also appropriate that, when receiving static images from the image acquiring means, the decision processing means makes a decision as to whether to select the static images and continues the decision processing only in the case of the selection thereof. As the selecting manner, for example, it can be considered to use a method of regularly and selectively thinning static images or a method of making the selection only when there is a difference between the static images continuing in time sequence.

Thus, the decision processing means can achieve an efficient decision without depending on the static image acquiring rate per unit time in the image acquiring means.

In this connection, in the decision means, the concrete decision as to whether or not a moving body exists in a composite image can be as follows. That is, a composite image is converted into binary image data and labeled and, on the basis of an area and shape of the resultant pixel set, a decision is made on the existence of a moving body. In this case, the "on the basis of an area and shape of a pixel set" signifies that, for example, noting the areas of the pixel sets, pixel sets having an area exceeding a predetermined area are selected. A moving direction is estimated on the basis of the direction in which the selected pixel set is elongated and, finally, a decision is made as to whether or not it is a moving body.

Accordingly, it is possible to suppress the influence of noise existing in images acquired by the image acquiring means and, hence, to detect the existence of a moving body with high accuracy.

It is preferable that, simultaneously with the labeling, an area of a pixel set is calculated through the use of a counter.

Thus, the decision as to whether a moving body exists in a composite image is more efficiently achievable.

Still furthermore, although the notifying means can be made to transmit the fact of the decision indicating the existence of a moving body to an internal separate apparatus, it is also appropriate that notifying means is provided which is for notifying the existence of a moving body to a user, and the decision means is made to give an instruction to the notifying means for notifying the existence of the moving body to the user.

This enables the moving body detecting apparatus itself to inform a user of the existence of a moving body.

Yet furthermore, it is preferable that the moving body detecting apparatus is used as an antitheft apparatus. Since the consumable power is limited during the vehicle storage, difficulty can be experienced in locating a sufficient light source(s), thus making it difficult to provide a static image having a sufficient contrast. Even in such a situation, the moving body detecting apparatus according to the present invention can achieve the detection with high accuracy, thus providing a high utility value.

In addition, the decision processing means of the moving body detecting apparatus is also realizable in a manner such that a program functioning as the decision processing means is used and implemented in a computer incorporated into the moving body detecting apparatus. This program is recorded on a computer-readable recording medium such as a flexible disk, magnetic optical disk, CD-ROM, hard disk, ROM or RAM, and is loaded into the computer and activated when needed. It is also possible to perform the loading and activation through a network.

Figure 15:
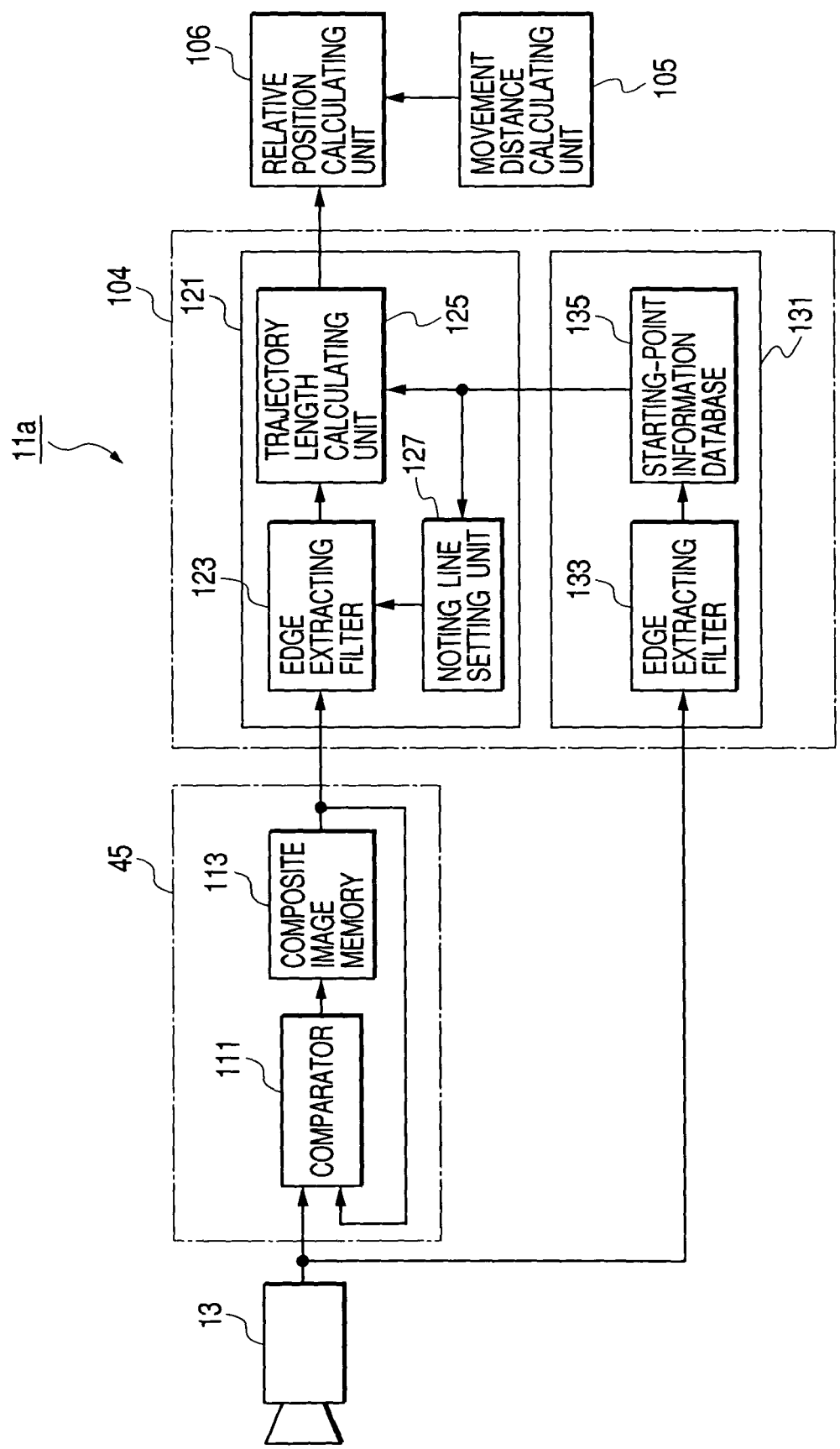
FIG. 15 is a block diagram showing a further configuration of the body detecting apparatus according to the first embodiment of the present invention.

FIG. 15 is a block diagram showing the entire configuration of a vehicle-mounted body detecting apparatus for detecting an body existing on a load at the rear of a vehicle or a mark drawn on a road on the basis of a plurality of input images (monochrome images) picked up continuously toward the rear of the vehicle.

As FIG. 15 shows, a body detecting apparatus 11a is made up of an image pickup device (camera) 13 for photographing the rear of a vehicle, an image composing unit 45 for carrying out the image composing processing on a plurality of input images picked up continuously by the image pickup device 13, a composite image processing unit 104 functioning as composite image processing means and comprises a starting-point extracting unit 131 for extracting, as a starting point, a feature point (which is equally referred to as an image pickup point) of a body from the input image at the start of the image composing processing and a displacement data producing unit 121 for obtaining displacement data (in this case, the coordinates of a starting point and end point of a trajectory, the length of the trajectory) indicative of a displacement of a static body appearing in the input image on the basis of the starting point extracted by the starting-point extracting unit 131 and a composite image produced by the image composing unit 45, a movement distance calculating unit 105 for detecting the distance of the movement of the vehicle while the image pickup device 13 picks up the images to be used in the image composing unit 45, and a relative position calculating unit 106 for obtaining the position of the photographed static body on the basis of the displacement data obtained in the composite image processing unit 104, the movement data forming the detection result in the movement distance calculating unit 105 and mounting data (focal length, mounting height, mounting angle, and others) indicative of a characteristic or mounting state of the image pickup device 45.

Figure 16A:
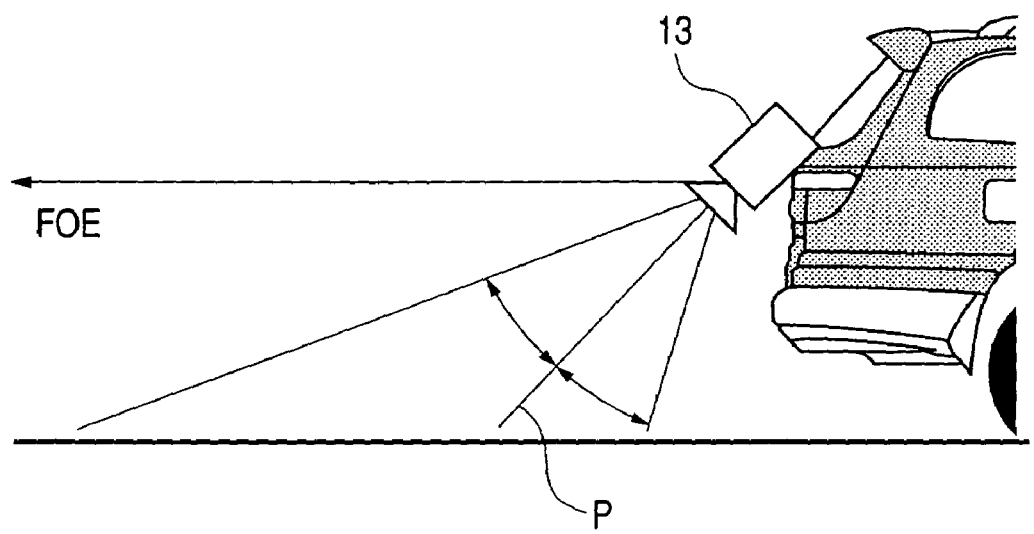
FIGS. 16A and 16B are illustrations useful for explaining a method of mounting an image pickup device.
Figure 16B:
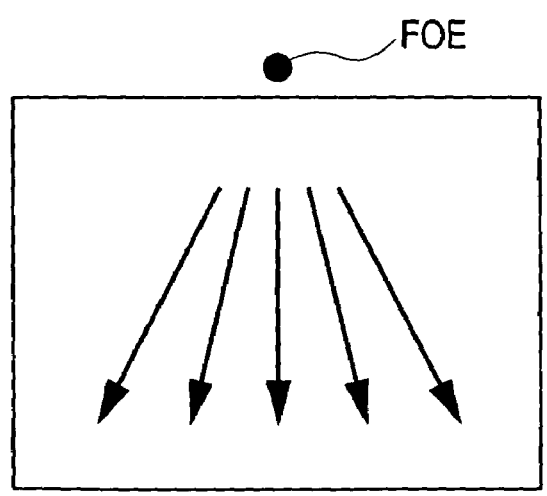

The image pickup device 13 is composed of a CCD camera or the like, and is set so that, as shown in FIG. 16A, its optical axis is directed obliquely and downwardly and, as shown in FIG. 16B, an infinity point (FOE) in an image picked up is placed at a central portion of a frame width in a horizontal direction and at an upper portion outside the frame in a vertical direction.

The image composing unit 45 is composed of a composite image memory 113 serving as a composite image storing means to store a composite image by one frame and a comparator 111 serving as a pixel value updating means to, with respect to each pixel existing at the same position in a frame, make a comparison in magnitude of the pixel value between a composite image stored in the composite image memory 113 and a monochrome image (which will be referred to hereinafter as an "input image") from the image pickup device 13 for updating the pixel value of the composite image when the pixel value of the input image is higher. However, the comparator 111 is made to directly store the input image at the start of image composing in the composite image memory 113.

In addition, the starting-point extracting unit 131 constituting the composite image processing unit 104 is composed of an edge extracting filter 133 for extracting an edge of an input image at the start of the image composing and a starting-point information database 135 for storing, as starting-point information, the coordinates of starting points in a frame in a state where pixels corresponding to the edge (image pickup point group) extracted by the edge extracting filter 133 are taken as the starting points.

The displacement data producing unit 121 is composed of a notice line setting unit 127 for setting, as a notice line, each of lines making connections between the starting points stored in the starting-point information database 135 and the FOE in an input image, an edge extracting filter 123 for, on the basis of a composite image stored in the composite image memory 113 after the image composing, extracting pixels corresponding to an edge of the composite image and existing on the notice lines as end points, and a trajectory length calculating unit 125 for combining the coordinates of the starting point and the end point existing on the same notice line to obtain, as a trajectory length, the distance between the starting point and the end point after the combination for producing displacement data including the coordinates and the trajectory length.

Figure 17B:
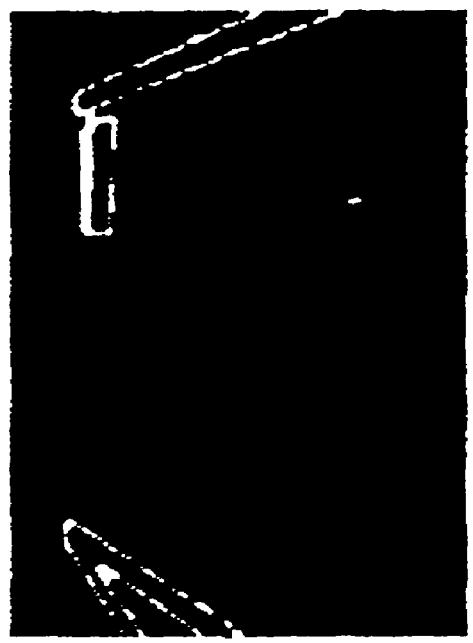
FIGS. 17A and 17B are illustrations of an input image at image composing and an example of an image of an edge forming a starting point of a trajectory, extracted from the input image.
Figure 17A:

FIG. 17A is an illustration of one example of an image to be taken by the image pickup device 13 in a case in which a vehicle is parked in a parking zone in a backward-looking posture, where there appear partition lines of a parking space and a tire stopper made using a concrete block.

When this image is supplied as an input image at the start of image composing to the starting-point extracting unit 131, as shown in FIG. 17B the edge extracting filter 133 extracts profiles of the partition lines and a profile of the tire stopper which have a higher contrast with respect to other portions, and the coordinates of the pixels corresponding to these profiles are stored as starting-point information in the starting-point information database 135.

Figure 18C:
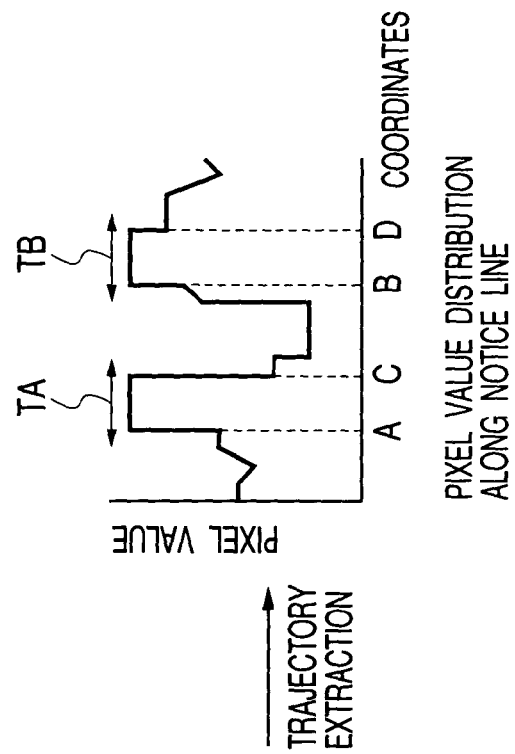
FIGS. 18A to 18C are illustrations useful for explaining an input image, an example of a composite image and a trajectory extracting method.
Figure 18B:
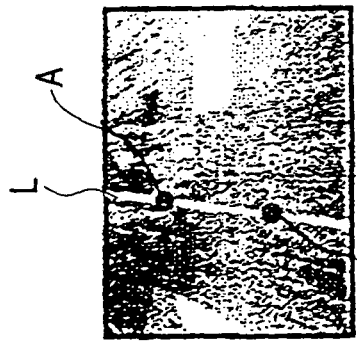
Figure 18A:
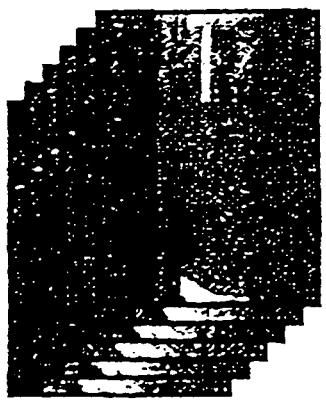

Moreover, the image composing unit 45 sequentially conflates a plurality of input images (see FIG. 18A) picked up by the image pickup device 13 in accordance with the backward movement of the vehicle to provide a composite image as shown in FIG. 18B. A trajectory of an image pickup point having a high gradient appears in that composite image, and the trajectory is along a notice line directed at the FOE.

FIG. 18C is a distribution map of pixel values of pixels on the notice line L shown in FIG. 18B. In this case, let it be assumed that two starting points A and B exist on the notice line L.

The edge extracting filter 123 extracts an edge (that is, a spot at which the pixel value decreases rapidly) along the notice line L from each of the starting points A and B, thereby extracting spots C and D as end points of the trajectory on the notice line L.

In addition, the trajectory length calculating unit 125 obtains the trajectory length TA between the starting point A and the end point C and the trajectory length TB between the starting point B and the end point D, and the displacement data producing unit 121 produces displacement data comprising the coordinates of each of the starting point A and the end point C and the trajectory length TA and displacement data comprising the coordinates of each of the starting point B and the end point D and the trajectory length TB.

The displacement data producing unit 121 conducts the same processing with respect to all the notice lines including starting points stored in the starting-point information database 135, with all the displacement data thus obtained being supplied to the position calculating unit 106.

Incidentally, although, in this case, an edge of a composite image is extracted along a notice line to extract an end point of a trajectory, it is also appropriate that a region including a starting point stored in the starting-point information database 135 and having a pixel value larger than a threshold set in advance is extracted from a distribution map (see FIG. 18C) of pixel values along a notice line and the length of the extracted region is obtained as a trajectory length.

The position calculating unit 106 calculates a position (relative distance, bearing, height from a road surface, and others) of a static body appearing in an input image on the basis of the displacement data (coordinates of starting points and end points of loci, trajectory lengths) thus obtained, the movement data on a vehicle (that is, the image pickup device 13) and the mounting data (focal length, mounting height, mounting angle) on the image pickup device 13 set in advance through the use of a well-known method (for example, see Japanese Patent Laid-Open Nos. HEI 7-78252 and 2001-187553) based on a tigonometrical survey.

As described above, the body detecting apparatus 11a conducts the image composing on input images taken continuously and obtains displacement data indicative of a displacement of a static body in a frame in the input images on the basis of a trajectory of an image pickup point appearing in the resultant composite image and a starting point extracted from the input image at the start of the image composing.

That is, with this body detecting apparatus 11a, it is possible to associate the same image pickup points shown in different images in a less calculation quantity without employing the pattern matching requiring a fabulous processing quantity and to obtain displacement data indicative of the displacement with high accuracy. As a result, this enables the detection of the position of a static body appearing in input images for a short time, and achieves high-reliability detection.

As described above, according to this embodiment, there is provided a displacement data extracting method of obtaining a plurality of input images continuously picked up and acquiring, as each of representative pixel values, a maximum value of pixels existing at the same positions in frames of the input images to produce a composite image comprising the representative pixel values and extracting displacement data indicative of a displacement of a photographed body in the frames on the basis of a trajectory of an image pickup point appearing in the composite image.

That is, in the case of a conventional technique (for example, Japanese Patent Laid-Open No. HEI 7-78252), although the distance between image pickup points (for example, edges of a body or the like) to be associated with each other becomes short as shown in FIG. 27A, eventually for specifying the association (correspondence), there is a need to carry out the pattern matching requiring a fabulous calculation quantity between input images. On the other hand, according to this embodiment, a trajectory of an image pickup point to be associated appears in a composite image and the association in image pickup point between the input images can clearly be seized on the basis of the trajectory, which can eliminate the need for the pattern matching.

For example, as the displacement data, it is also possible to use the coordinates of a starting point and end point of a trajectory of an image pickup point or to use a length of the trajectory.

Furthermore, as described above, there is provided a body detecting apparatus comprising image composing means for obtaining a plurality of input images continuously picked up and acquiring, as each of representative pixel values, a maximum value of pixels existing at the same positions in frames of the input images to produce a composite image comprising the representative pixel values and composite image processing means for extracting displacement data indicative of a displacement of a photographed body in the frames on the basis of a trajectory of an image pickup point appearing in the composite image.

That is, this body detecting apparatus realizes the above-mentioned displacement data extracting method, and provides the same effects.

The image pickup device can be fixed in place or can also be mounted on a mobile body (moving body). In the case of the image pickup device being fixed in place, a movement quantity of a mobile body can be obtained on the basis of the displacement data extracted by the composite image processing means. On the other hand, in the case of the image pickup device being mounted on a mobile body, a position of a static body can be obtained on the basis of distance data indicative of a movement distance of the mobile body in the middle of the photograph of the input images used for the production of the composite image, the displacement data extracted by the composite image processing means and the mounting position data indicative of the mounting position of the image pickup device.

Meanwhile, in a case in which mobile body is going straight along a line directed at the motion infinity point (FOE: Focus Of Expansion) in the input image, an image pickup point on a static body photographed as an input image forms a trajectory along a notice line in a composite image.

Therefore, the composite image processing means extracts, as a starting point (see "S" in FIG. 28A), an edge of a body taken in an input image at the start of image composing in the image composing means and extracts, as an end point (see "E" in FIG. 28B), an edge of a trajectory shown in a composite image produced by the image composing means, and a line passing through a motion infinity point in an input image is set as a notice line (see "L" in FIGS. 28A and 28B) and the displacement data is obtained on the basis of a starting point and an end point existing on the same notice line.

Moreover, in this case, if the image composing means performs the image composing on only the pixels on the notice line, needed for obtaining the displacement data, the processing quantity in the image composing means is considerably reducible.

However, since there is a possibility that a plurality of starting points exists on the same notice line, it is preferable that the image composing means controls the timing of the completion of image composing according to starting point to prevent the loci different in starting point from each other from being connected to each other.

Furthermore, the image composing means includes composite image storing means, and pixel updating means sequentially compares a pixel value of an input image obtained from the image pickup device and a pixel value of a composite image stored in the composite image storing means and, if the pixel value of the input image is larger than the pixel value of the composite image, updates the storage contents in the composite image storing means with the pixel value of the input image.

In this case, since the pixel value of the input image obtained from the image pickup device is temporarily preserved, it is possible to reduce the storage capacity and to speed up the composing processing.

Furthermore, the mounting height of the image pickup device from a road surface varies due to a variation of the posture of the vehicle or sinking of the vehicle body. Therefore, in a case in which there is a need to calculate the height of an image pickup point from a read surface on the basis of displacement data, it is preferable to make a correction for offsetting the variation of the mounting height.

Still furthermore, in a case in which the image pickup device is placed so that the motion infinity point in an input image exists within a frame, a body at the infinity becomes detectable, thus enlarging the detection range. However, if the motion infinity point is positioned in the vicinity of a central portion of the frame, the notice line extending to the motion infinity point becomes shorter and, hence, difficulty is encountered in sufficiently exhibiting the distance resolution an input image has.

For this reason, it is preferable that the image pickup device is placed so that the motion infinity point is positioned at a circumferential edge of a frame.

However, in a case in which there is no need to detect a body at the infinity and it is possible to limit the body detection range, the image pickup device can be placed so that the motion infinity point is positioned in the exterior of the frame. Moreover, when the image pickup device is placed so that the optical axis coincides with a vertical direction (that is, the motion infinity point is positioned at the infinity), it is possible to exhibit the maximum distance resolution of an input image.

Second Embodiment

Although the above-described moving body detecting apparatus according to the first embodiment acts as an antitheft apparatus to be mounted in a vehicle, it is also applicable to a break-in-prevention apparatus to be installed at a place, such as an entrance or window of a building, where it is required to prevent an intruder from breaking in. Moreover, it is also applicable to an antitheft apparatus to be installed at a spot such as a store or art museum requiring the prevention of approach of a thief around an article or picture. As one example, the camera 13 is set to provide static images of an interior of an art museum and the interior of an exhibition room is set as an allowable area while an exhibit, such as a picture in the room, and its vicinities is set as an unallowable area.

In the above-described moving body detecting apparatus 11 according to the first embodiment, in a case in which a moving body around a vehicle exists continuously for a predetermined period of time, warning can be made to that moving body. Concretely, in a case in which the motion detecting unit 33 detects that a pixel set residing in common to the previous frame and the present frame is in an allowable area, if the pixel set exists continuously in the allowable area for a predetermined period of time (for example, several seconds), a warning is given to that moving body, such as 1) a warning being made with a voice from the speaker 41, 2) an alarm lamp being lighted, and 3) a buzzer being sounded. This can previously prevent a moving body around the vehicle from breaking in the vehicle.

In addition, in the above-described moving body detecting apparatus 11 according to the first embodiment, in a case in which the recognizing unit 37 judges that an intruder from the exterior of a vehicle to the interior thereof exists, information to the effect of the existence of the intruder can be sent through a transmitting means to an external different apparatus such as a portable telephone pertaining to the owner of the vehicle or a telephone in a house of the owner of the vehicle. This achieves quick notification on the existence of an intruder from the exterior of the vehicle to the interior thereof to the owner of the vehicle.

Still additionally, in the above-described moving body detecting apparatus 11 according to the first embodiment, in a case in which the recognizing unit 37 judges that an intruder from the exterior of a vehicle to the interior thereof exists, static images in which the intruder appears is preserved in the present image memory 19. This can record the fact that valuables such as a purse were stolen from the interior of the vehicle.

Moreover, although in the above-described embodiment the background image memory 17 is initialized at the start of the decision processing and background images are stored in the initialized background image memory 17, it is also appropriate that, for example, the background images are updated when the decision in the recognizing unit 37 indicating no existence of an intruder is made a predetermined number of times.

Still moreover, although in the above-described embodiment the monitoring regions "201" and "203" for monitoring window portions in static images are set as an "allowable area" while the monitoring regions "202" and "204" for monitoring door body portions in the static images are set as an "unallowable area" as shown in FIG. 2B, the present invention is not limited to this but it is also appropriate that, for example, the monitoring regions "201" and "203" are set as the unallowable area while the monitoring regions "202" and "204" are set as the allowable area, thus detecting a body such as a handbag or purse brought from the interior of the vehicle to the exterior thereof. In this case, the unallowable areas are positioned above the allowable areas. Concretely, in the decision processing to be implemented in the recognizing unit 37, of the above-mentioned conditions (1) to (3), the condition (2) is altered to the following condition (2'). That is, when the following condition is satisfied, a decision is made that a body such as a handbag or purse is moved from a door body portion of a vehicle to a window portion thereof.

the area of a monitoring region>a fourth threshold  (2'-1)

the direction of a motion vector is upward  (2'-2)

The fourth threshold corresponds to an area of a pixel set determined to detect a body such as a handbag or purse reflected in the door body portion of the vehicle and is prescribed in advance through experiments or the like. If there is a pixel set satisfying all the above-mentioned conditions (1), (2') and (3), a decision is made that this pixel set represents a body such as a handbag or purse. This enables the detection of a body such as a handbag or purse taken out from the interior of a vehicle to the exterior thereof.

Furthermore, although in the above-described embodiment a static image is divided into a vehicle interior image and a vehicle exterior image, and is stored in the background image memory 17 or the present image memory 19, the present invention is not limited to this, but it is also appropriate that a monitoring region extracted from a static image is divided into a vehicle interior image and a vehicle exterior image, and is stored in the background image memory 17 or the present image memory 19. In this case, since only the monitoring area is stored in each memory, the memory size of the storage unit is reducible as compared with the case of storing a static image.

Still furthermore, although in the above-described embodiment the pixel signals in the monitoring regions "201" to "204" are encoded with the numerical value "1" and the pixel signals in the other regions are encoded with the numerical value "0", the present invention is not limited to this, but it is also appropriate that the encoding is made with a different numerical value for each monitoring region. Concretely, the encoding (multi-valued conversion) is made with the numerical value "1" for the monitoring region "201", the encoding is made with the numerical value "2" for the monitoring region "202", the encoding is made with the numerical value "3" for the monitoring region "203", the encoding is made with the numerical value "4" for the monitoring region "204", and the encoding is made with the numerical value "0" for the non-monitoring region.

In addition, although in the above-described embodiment each of the monitoring regions is set in the form of a point set such as bit map data, the present invention is not limited to this, but it is also appropriate that the monitoring regions are prescribed using the boundary (border) lines of their outer circumferences. These boundary lines can be expressed in the form of a point set or using a function. In this case, the data quantity for setting the monitoring regions becomes only data for setting the boundary lines and, hence, the data quantity is reducible as compared with the above-mentioned case of setting the monitoring regions in the form of a point set, thus reducing the memory size of the storage unit for storing the set data.

Figure 2C:
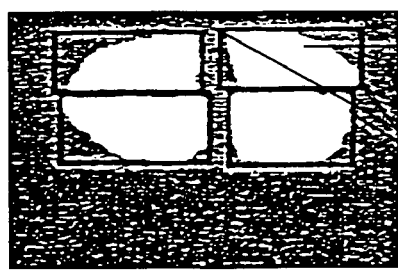
FIG. 2C is an illustration useful for explaining a monitoring range to be set in a static image.

Still additionally, for example, in a case in which there is no need to distinguish strictly between the vehicle interior and the vehicle exterior, the monitoring regions can also be set as circumscribed rectangles. In this case, if the monitoring regions are set at both end portions of a diagonal line of the rectangle, the data quantity is further reducible. As one example, as shown in FIG. 2C, the monitoring region "203" is set in the form of a rectangle in which the coordinate 1 (200, 20) and the coordinate 2 (400, 60) constitute both ends of a diagonal line. Each side of the rectangle forms a boundary line of a monitoring region.

Third Embodiment

Figure 19:
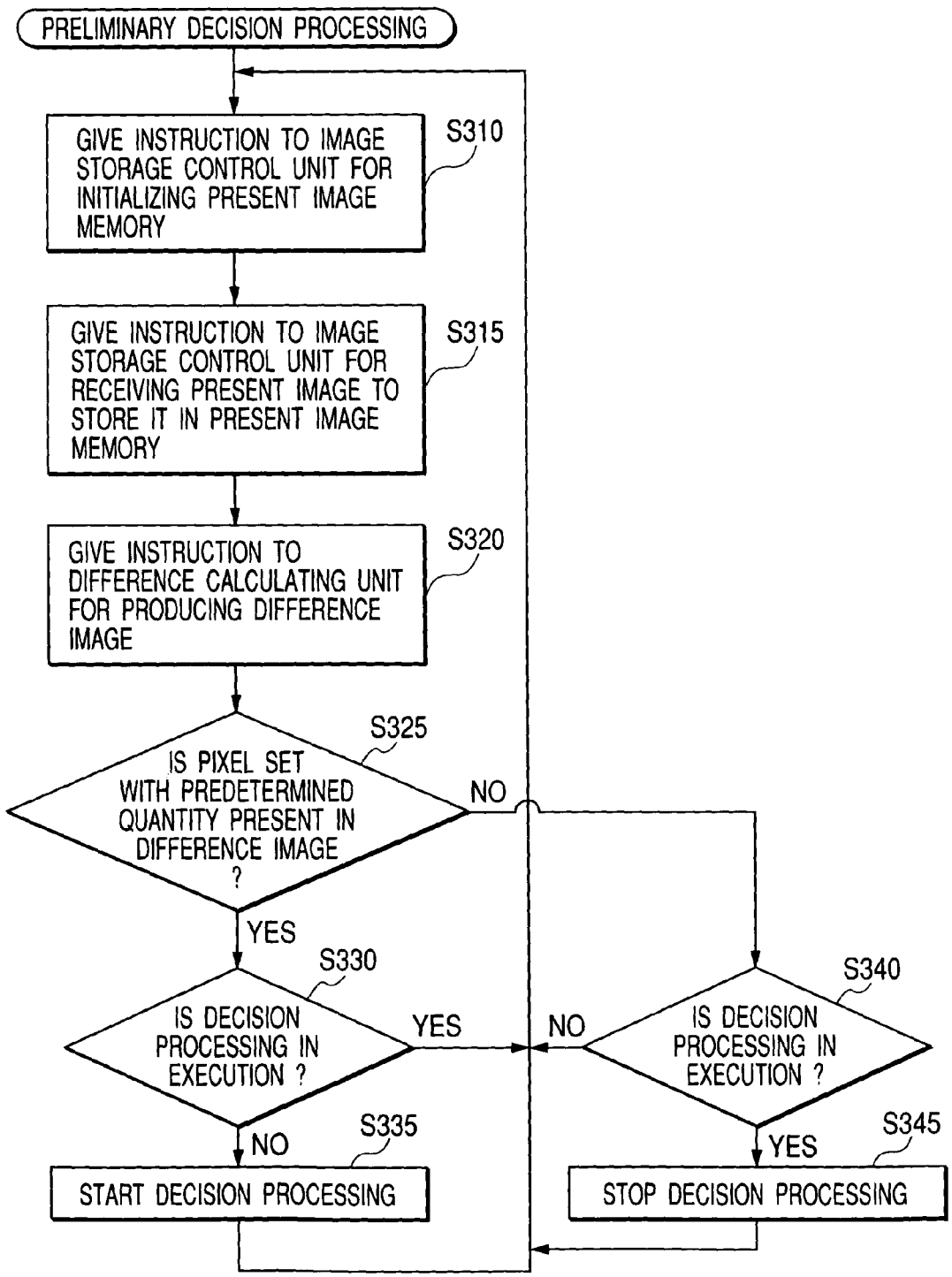
FIG. 19 is a flow chart useful for explaining preliminary decision processing according to a third embodiment of the present invention.
Figure 20:
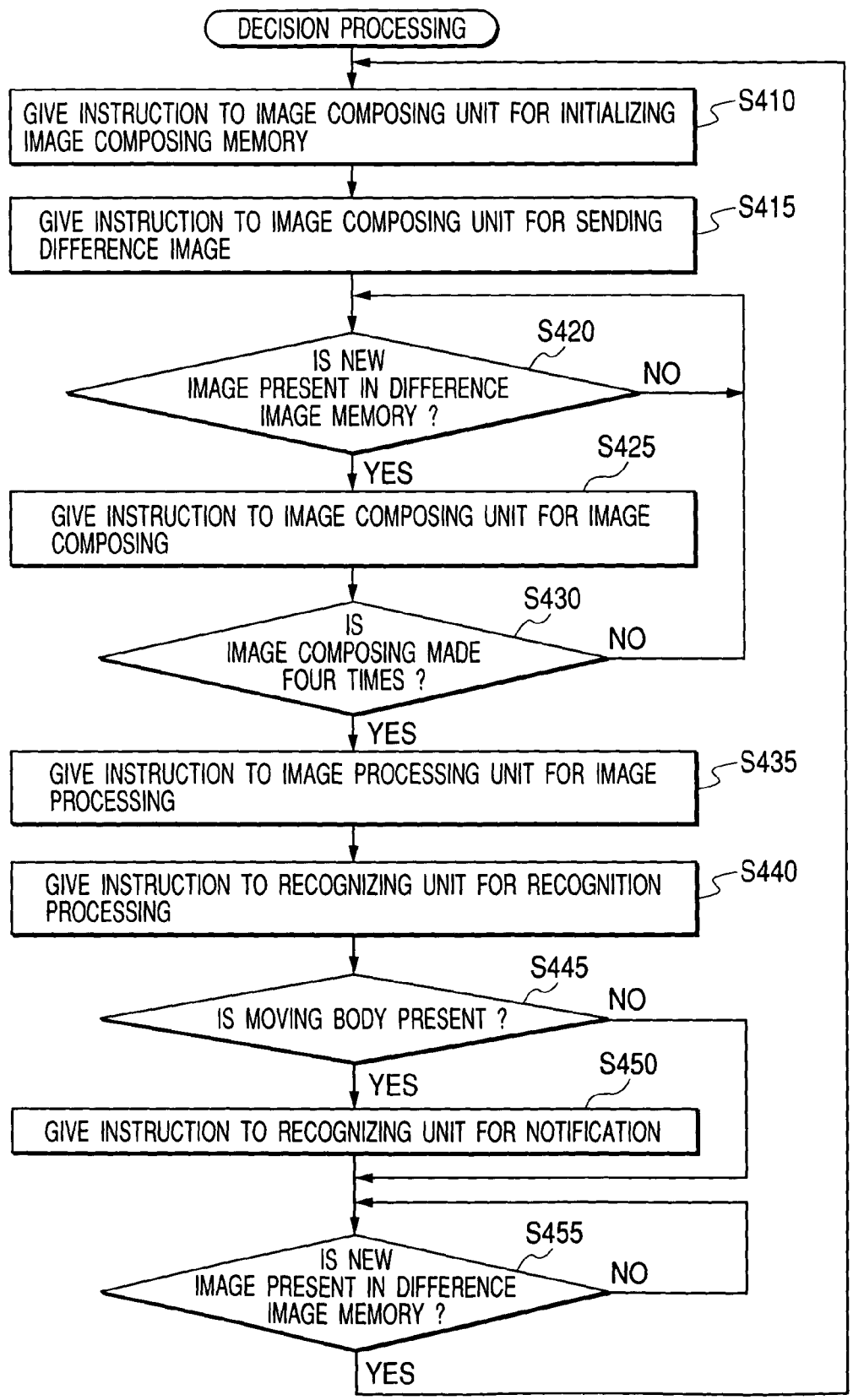
FIG. 20 is a flow chart useful for explaining decision processing according to the third embodiment.

Referring to FIGS. 8, 19 and 20, a description will be given hereinbelow of a moving body detecting apparatus 401 according to a third embodiment of the present invention. The description will basically be made about the differences from the above-described moving body detecting apparatus 11 for brevity.

A control unit 437 is made to implement preliminary decision processing and decision processing, and the preliminary decision processing starts in response to the power-on of the moving body detecting apparatus 401, and the decision processing starts in the middle of the preliminary decision processing.

The preliminary decision processing will first be described with reference to a flow chart of FIG. 19.

In S310, an instruction is given to the image storage control unit 55 for initializing the present image memory 19. Upon receipt of this instruction, the image storage control unit 55 initializes the present image memory 19. After the completion of the initialization, the image storage control unit 55 makes a reply on the fact of the initialization completion to the control unit 437, and upon receipt of this reply, the control unit 437 executes the following steps. Although the description will be omitted in the following steps, as with this step, when receiving various types of instructions, each of the units (the image storage control unit 55, and others) makes a replay on the completion of that instruction to the control unit 437, and upon receipt of the replay, the control unit 437 executes the following steps.

In S315, an instruction is given to the image storage control unit 55 for receiving static images from the camera 13 to store them in the present image memory 19. Upon receipt of this instruction, the image storage control unit 55 acquires static images from the camera 13 and puts them in the present image memory 19.

In S320, an instruction is given to the difference calculating unit 21. Upon receipt of this instruction, the difference calculating unit 21 calculates, for each pixel, the absolute value of the difference in luminance value between a background image stored in the background memory 17 and a static image stored in the present image memory 19 to produce a difference image in a manner such that the calculated value is set as a pixel value, with the produced difference image being stored in the difference image memory 23.

In S325, an instruction is given to the difference calculating unit 21 for making a decision as to whether a predetermined quantity of pixel set exists in the difference image. Upon receipt of this instruction, the difference calculating unit 21 makes a decision as to whether, in the calculated difference image, a pixel set having a predetermined quantity exists at a window portion. In this case, the "predetermined quantity" signifies a magnitude or size of a pixel set appearing when a person stands in the vicinity of a door. If there is a pixel set having the predetermined quantity, the operational flow advances to S330. Otherwise, the operational flow proceeds to S340.

The operational flow from S330 depends on whether or not the decision processing, which will be mentioned later, is in execution. If the decision processing is in execution, the operational flow returns to S310. Otherwise, the operational flow proceeds to S335. In S335, the decision processing is started and, after the starting, the operational flow returns to S310.

The operational flow from S340 depends on whether or not the decision processing is in execution. If the decision processing is in execution, the operational flow proceeds to S345. Otherwise, the operational flow returns to S310. In S345, the decision processing is forcibly stopped, and then the operational flow returns to S310.

Secondly, the decision processing will be described hereinbelow with reference to a flow chart of FIG. 20.

In S410, an instruction is given to the image composing unit 45 for the initialization of the image composing memory 47. Upon receipt of this instruction, the image composing unit 45 initializes the image composing memory 47.

In S415, an instruction is given to the image composing unit 45 for transferring a difference image to the image composing memory 47. In response to this instruction, image composing unit 45 reads out a difference image from the difference image memory 23 and stores it as a composite image in the image composing memory 47. This composite image is identical to the difference image.

In S420, an instruction is given to the difference calculating unit 21 for checking whether or not a newer difference image than the difference image transferred in S415 exists in the difference image memory 23. In response to this instruction, the difference calculating unit 21 makes a decision as to whether or not a newer difference image exists in the difference image memory 23, and makes a reply on that decision result to the control unit 437. If the newer difference image exists in the difference image memory 23, the operational flow advances to S425. Otherwise, the operation falls into the stand-by condition until a new difference image is stored in the difference image memory 23.

In S425, the value of a counter to be used for the decision in S430, which will be mentioned later, is incremented by one, and an instruction is given to the image composing unit 45 for the image composing. In response to this instruction, the image composing unit 45 reads out, pixel by pixel, a difference image from the difference image memory 23 and a composite image from the image composing memory 47 to make a comparison between the pixel values. If the pixel value of the difference image is higher, the pixel value of the pixel stored in the image composing memory 47 and compared is updated with the pixel value of the difference image. On the other hand, if the pixel value of the difference image is lower, nothing is done. This processing is conducted with respect to all the pixels.

In S430, on the basis of the counter value, a decision is made as to whether or not the image composing instruction to the image composing unit 45 in S425 has been given four times. If the image composing instruction has been made four times, the value of the counter is set at zero, and the operational flow advances to S435. On the other hand, if the image composing instruction does not reach four times, the operational flow returns to S420.

In S435, an instruction is given to the image processing unit 49 for the image processing. Upon receipt of this instruction, the image processing unit 49 reads out a composite image from the image composing memory 47 and conducts various image processing such as binary conversion and labeling to be implemented before image recognition and stores it in the image processing memory 50.

In S440, an instruction is given to the recognizing unit 37 for the recognition processing. Upon receipt of this instruction, the recognizing unit 37 reads out an image from the image processing memory 50 to make a decision as to whether or not a moving body exists in that image, and returns the decision result to the control unit 437. This decision is made in consideration of a shape, area or the like of pixel set.

The operational flow from S445 depends on the decision result in the recognizing unit 37 in S440. If the decision result in S440 shows the existence of a moving body, the operational flow advances to S450. On the other hand, if the decision result in the S440 shows no existence of a moving body, the operational flow advances to S455.

In S450, a signal is sent to the speaker 41 to sound a siren for a predetermined period of time (for example, 1 minute). After the elapse of the predetermined period of time, the sending of the signal to the speaker 41 comes to a stop, and the operational flow returns to S455.

In S455, an instruction is given to the difference calculating unit 21 for checking whether or not a newer difference image than the difference image in S420 exists in the difference image memory 23. In response to this instruction, the difference calculating unit 21 makes a decision as to whether or not a newer difference image exists in the difference image memory 23 and returns the decision result to the control unit 437. If the newer difference image exists in the difference image memory 23, the operational flow returns to S410. Otherwise, the operation falls into the stand-by condition until a new difference image is stored in the difference image memory 23. This decision processing is repeatedly conducted until the power supply of the moving body detecting apparatus 11 is cut off or until it is stopped by the preliminary decision processing.

In the moving body detecting apparatus 401, the control unit 437, the image storage control unit 55 and the difference calculating unit 21 correspond to preliminary decision processing means, while the control unit 437, the difference calculating unit 21, the image composing unit 45, the image processing unit 49 and the recognizing unit 37 correspond to the decision means.

With this moving body detecting apparatus 401, since the decision processing is conducted only when needed, if the power per unit time to be used for the decision processing is larger than the power per unit time to be used for the preliminary decision processing, the power consumption per unit time is reducible as compared with the case in which the decision processing is carried out at all times.

As described above, for the implementation timing of the decision processing, the preliminary decision processing is provided to compare a background image stored in advance and a static image obtained by the image acquiring means with each other with respect to a predetermined region to make a preliminary decision as to whether or not they shows a difference exceeding a predetermined quantity and the decision means conducts the decision processing only while the preliminary decision result in the preliminary decision processing means indicates a difference exceeding the predetermined quantity. In this case, the "predetermined region" signifies a specified area in an image determined in advance, and the "difference exceeding the predetermined quantity" signifies a quantitatively calculable physical quantity, for example, the number of pixels having different luminance values (disagreement in luminance) or the discrete degrees of these pixels.

In a case in which the moving body detecting apparatus is used as a break-in detecting apparatus for a vehicle, the image acquiring means is set so that a door portion and a window portion of a door are photographed to obtain static images and the window portion in the static image is set as a predetermined region for which the preliminary decision means makes a preliminary decision. In this case, the preliminary decision processing means compares the window portion in a background image stored in advance and the window portion in a static image acquired by the image acquiring means to continuously make a decision as to whether or not a difference therebetween, which indicates the possibility of existence of a person, exists in both the images. Moreover, the decision means implements a series of decision processing only while the decision in the preliminary decision processing means shows the "difference indicating the possibility of existence of a person".

Thus, only when a person appears in the window portion, that is, only when a person exists in the vicinity of a door in the exterior of the vehicle, the decision processing means implements a series of decision processing. Accordingly, the decision processing is conducted only when needed, if the power per unit time to be used for the decision processing in the decision processing means is larger than the power per unit time to be used for the preliminary decision processing in the preliminary decision processing means, the power consumption per unit time is reducible as compared with the case in which the decision processing is carried out at all times.

Fourth Embodiment

In the moving body detecting apparatus 401 according to the third embodiment, it is also appropriate that a difference image for only a required region, for example, a difference image for only a window portion, is produced in the preliminary decision processing. This can further enable the reduction of power consumption. However, there is a need to produce a difference image in the decision processing on another occasion.

Although in the above-described embodiment a composite image is produced from five static images, no limitation is imposed on the number of static images. It can be determined on the basis of information such as a possible frame rate of the camera 13 or an estimated movement speed of a moving body forming an object of detection.

Although in the above-described embodiment all the static images taken by the camera 13 are made to be put to use, it is also appropriate that a selecting means is provided to selectively use the static images taken by the camera 13. As the selecting manner, it can be considered to use a method of regularly and selectively thinning static images or a method of dynamically changing the number of static images to be used on the basis of the processing load. This enables the realization of the present invention even through the use of a processing unit such as a CPU having a low processing ability per unit time.

It is also appropriate that, when the image processing unit 49 conducts the labeling processing, an area of a pixel set is simultaneously calculated through the use of a counter and the calculation result is handed over to the recognizing unit 37. This can reduce the processing load on the recognizing unit 37 and can improve the processing efficiency as a whole.

Although in the above-described embodiments each of parts such as the control unit 39, 437, the image storage control unit 55, the difference calculating unit 21 and others is an electronic circuit constructed separately using a CPU, a ROM, a RAM and other components, it is also appropriate to realize all the parts through the use of one CPU and a program to be executed by the CPU.

The steps in the above-described embodiments can also be implemented in parallel or in a difference sequence provided that it can provide the effects of the present invention.

Fifth Embodiment

Furthermore, a description will be given hereinbelow of a body detecting apparatus according to a fifth embodiment of the present invention. The difference of this body detecting apparatus according to the fifth embodiment from the body detecting apparatus according to the first embodiment is only a portion of the configuration of the image composing unit, and the description will principally be given about the portion different therefrom.

Figure 21:
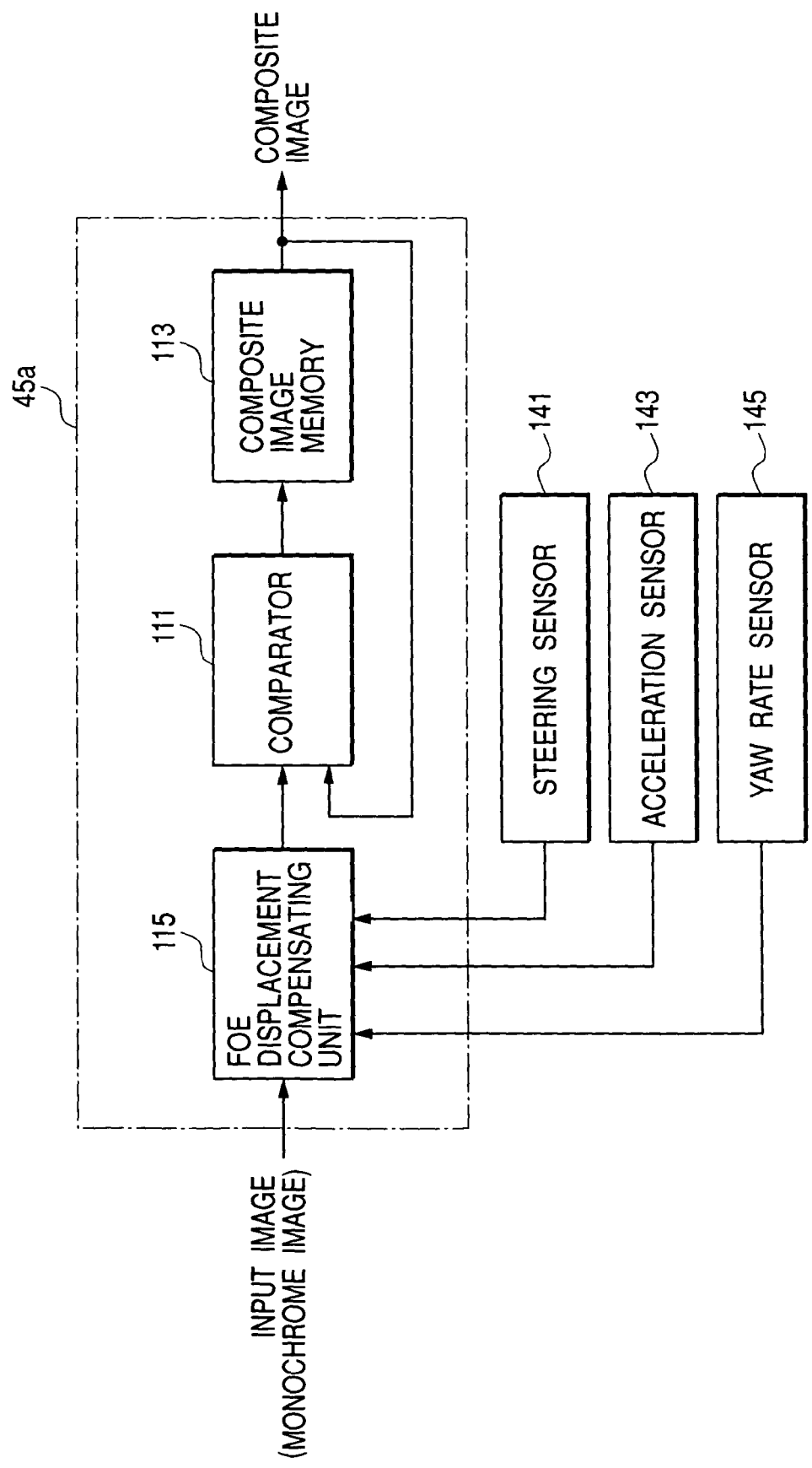
FIG. 21 is a block diagram showing a configuration of an image composing unit of an object detecting apparatus according to a fifth embodiment of the present invention.

That is, in this embodiment, as shown in FIG. 21, an image composing unit 45a is provided with an FOE displacement compensating unit 115 functioning as a compensating means to compensate for a displacement (positional deviation) of the FOE (Focus Of Expansion) occurring among the input image from the image pickup device 13 on the basis of detecting signals from a steering sensor 141 for detecting a variation of the advancing (traveling) direction of a vehicle, an acceleration sensor 143 for detecting a speed variation of the vehicle in the advancing direction and a yaw rate sensor 145 for detecting a variation of the angular velocity of the vehicle in its turning direction. The input images undergoing the displacement compensation in the FOE displacement compensating unit 115 are supplied to the comparator 111.

Figure 22C:
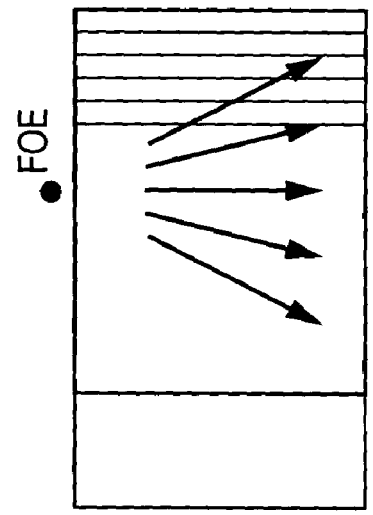
FIGS. 22A to 22C are illustrations useful for explaining an operation of an FOE (Focus Of Expansion) displacement compensating unit when an advancing direction of vehicle is changed.
Figure 22B:
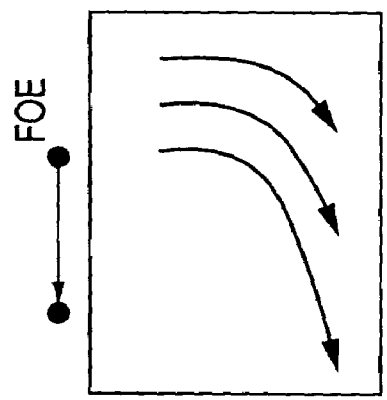
Figure 22A:

In a case in which the advancing direction of a vehicle varies during the image composing on input images as shown in FIG. 22A, the FOE of the input image (which will hereinafter be referred to as a "present FOE") is horizontally displaced or shifted along a horizontal plane with respect to the FOE of the input image at the start of the image composing (which will hereinafter be referred to as an "initial FOE") as shown in FIG. 22B. In the body detecting apparatus constructed as mentioned above, the FOE displacement compensating unit 115 detects this displacement on the basis of a detection signal from the steering sensor 141 and, as shown in FIG. 22C, horizontally shifts the association (correspondence) in pixel between the composite image and the input image to offset the FOE displacement so that the present FOE coincides with the initial FOE.

Moreover, in a case in which the posture of a vehicle is inclined forwardly or backwardly due to rapid acceleration/deceleration, the present FOE is displaced vertically with respect to the initial FOE. The FOE displacement compensating unit 115 detects this displacement on the basis of a detection signal from the acceleration sensor 143 and vertically shifts the association in pixel between the composite image and the input signal to compensate for the FOE displacement so that the present FOE agrees with the initial FOE.

Still moreover, in a case in which a vehicle is inclined in a road surface width direction as shown in FIG. 23A or it is inclined in a roll direction due to its turning, the input image is shifted in a turning direction with respect to the input image at the start of the image composing. The FOE displacement compensating unit 115 detects this displacement on the basis of a detection signal from the yaw rate sensor 145 and, as shown in FIG. 23B, shifts the association in pixel between the composite image and the input image in vertical directions, horizontal directions and turning directions so that the present FOE agrees with the initial FOE and the horizontal and vertical directions in the frames agree with each other.

Owing to this compensation, the trajectory of an image pickup point becomes a straight line(s) along a notice line(s) as shown in FIG. 22C or 23B without becoming a curve as shown in FIG. 22B and, hence, a composite image can be processed to extract displacement data as in a case in which the vehicle is going straight. That is, the position of a static body appearing in an input image can easily be obtained stably and accurately irrespective of the variation in behavior and posture of the vehicle.

As described above, if the moving direction of the mobile body or the posture of a mobile body (in other words, the posture of the image pickup device mounted on the mobile body) varies in accordance with a behavior of the mobile body, a displacement of the motion infinity point occurs between input images to be used for the production of a composite image, and when this displacement occurs, the trajectory in the composite image deviates from the notice line and, hence, the acquisition of the displacement data such as a trajectory length becomes more troublesome. Therefore, the image composing means includes compensating means to, if a displacement of the infinity point occurs, compensate for the displacement by varying the association between the pixel of the input image obtained from the image pickup device and the pixel of the composite image stored in the composite image storing means.

In this case, the compensating means can detect a variation of the advancing direction of a mobile body as the behavior of the mobile body, and in particular, if the mobile body is a vehicle, the compensating means can detect a variation of the posture of the vehicle.

In addition, as the variation of the posture of the vehicle, it is possible to detect at least one of the inclination of the vehicle in a longitudinal direction due to an acceleration in the advancing direction of the vehicle and the inclination in transverse direction due to an angular velocity in a turning direction of the vehicle.

Sixth Embodiment

Figure 24A:
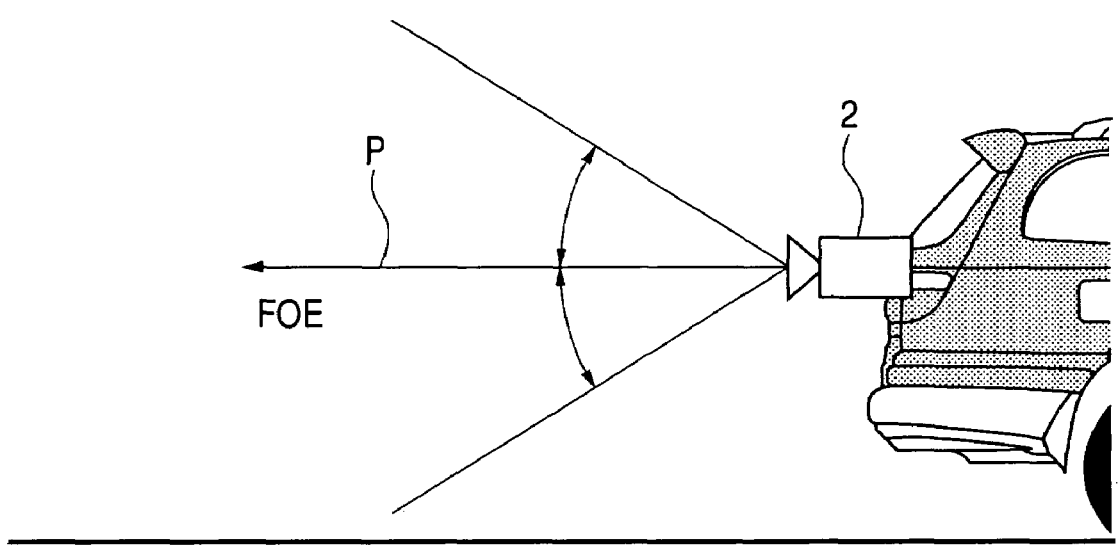
FIGS. 24A and 24B are illustrations useful for explaining a method of mounting an image pickup device.
Figure 24B:
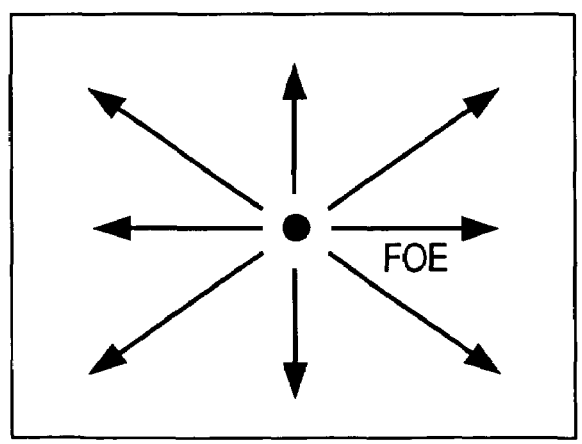

Although in the above-described embodiment the image pickup device 13 is set such that the FOE is placed at a central portion of a frame width in a horizontal direction and at an upper portion outside the frame in a vertical direction, it is also appropriate that the image pickup device 13 is set such that an optical axis P agrees with the direction of the FOE as shown in FIG. 24A and the FOE is positioned at a central portion of a frame as shown in FIG. 24B.

Figure 25A:
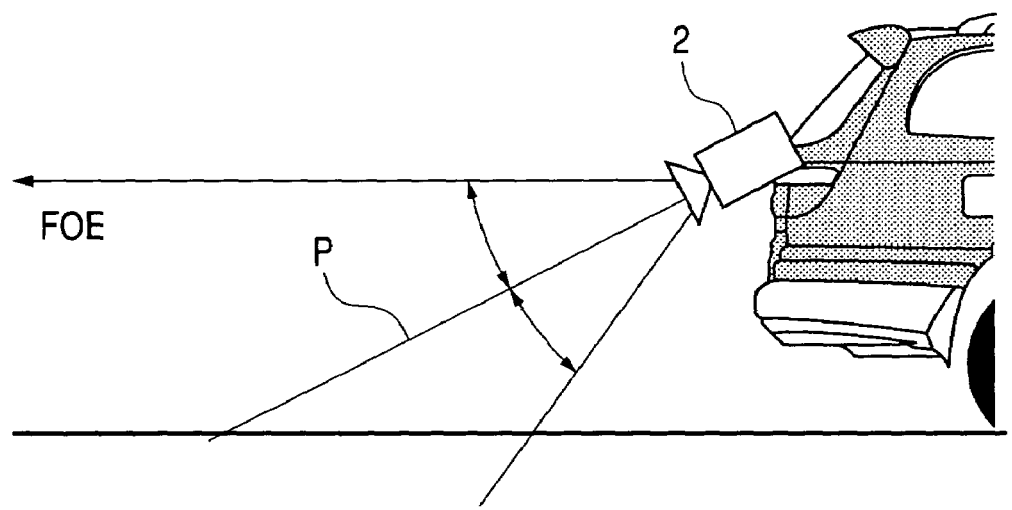
FIGS. 25A to 25C are illustrations useful for explaining a method of mounting an image pickup device.
Figure 25B:
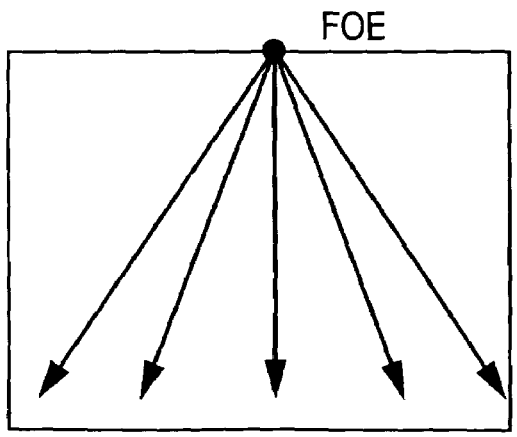
Figure 25C:
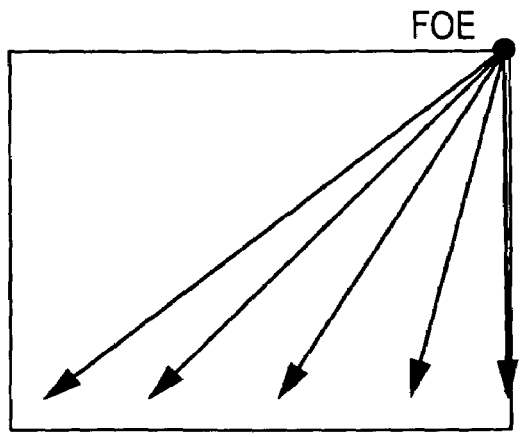

However, in this case, limitation is imposed on the resolution in the direction indicating the height of an image pickup object or in the direction indicating the distance up to the image pickup object and the calculation accuracy lowers. For this reason, it is preferable that, for making the most of the resolution, the image pickup device 13 is placed such that, at least, an upper end of the image pickup range of the image pickup device 13 coincides with the FOE direction as shown in FIG. 25A and the FOE is positioned at an upper edge portion of the frame as shown in FIGS. 25B and 25C.

Figure 26A:
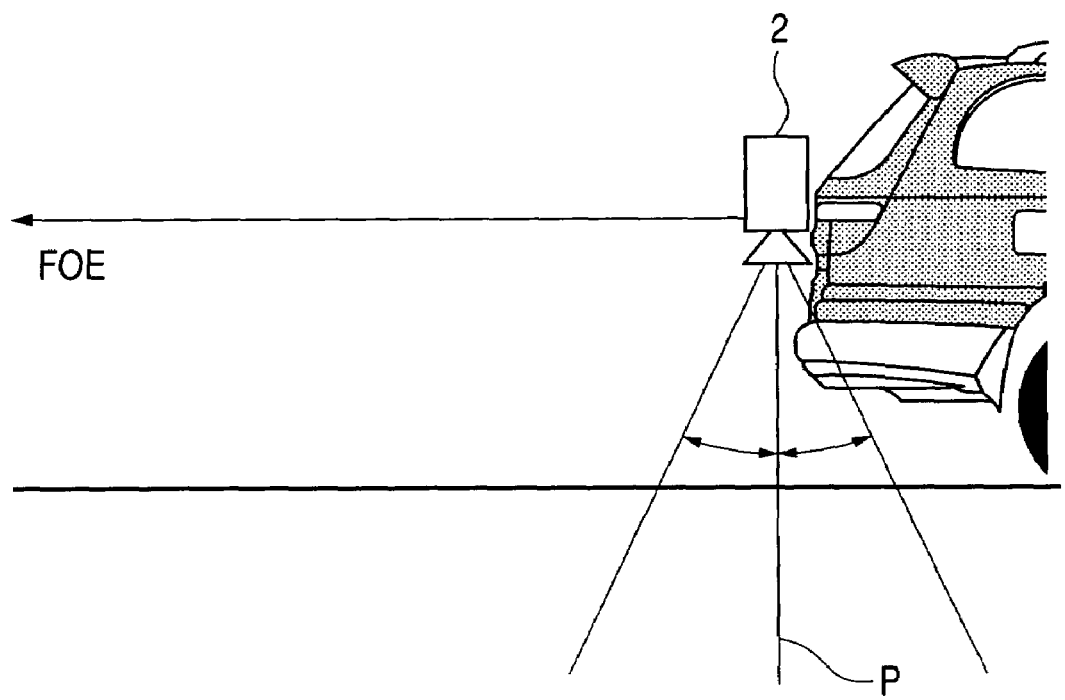
FIGS. 26A and 26B are illustrations useful for explaining a method of mounting an image pickup device.
Figure 26B:
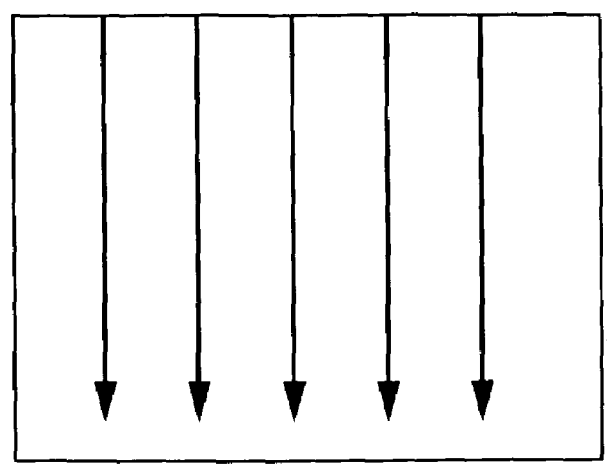
Figure 29:
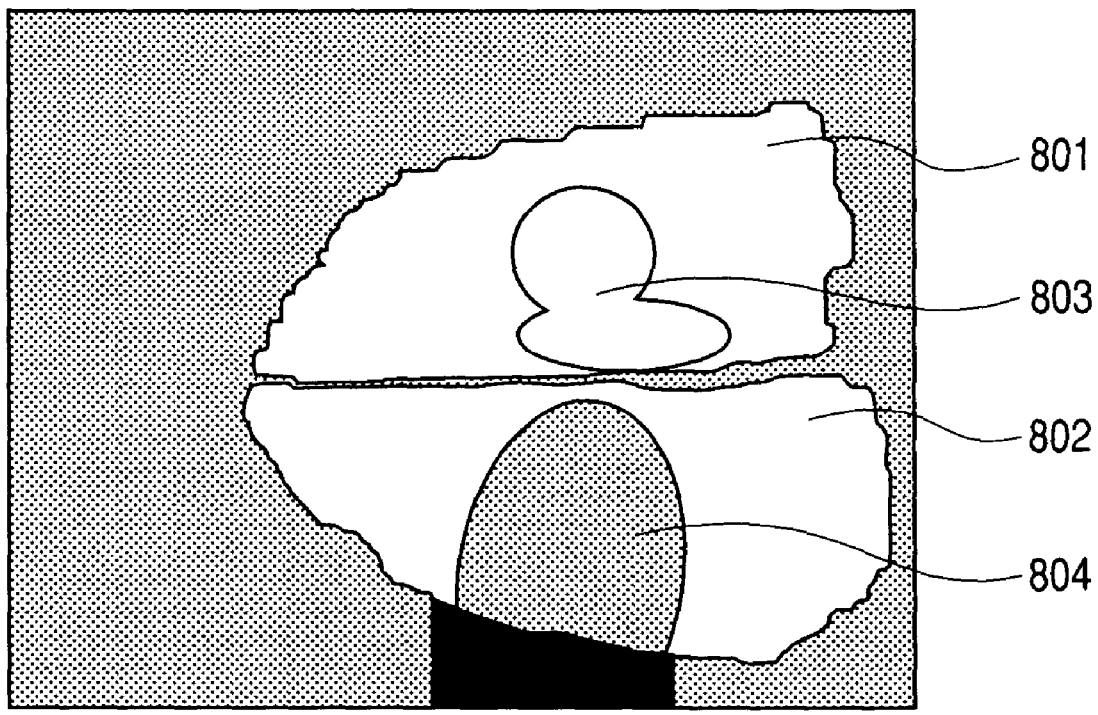
FIG. 29 is an illustration for explaining conventional decision processing.

Moreover, although even a body far apart therefrom can be accommodated in a frame in the case of the FOE being positioned in the frame in this way, if it is possible to limit the detection range, the image pickup device 13 can also be installed so that the optical axis agrees with a vertical direction as shown in FIG. 26A and the notice lines become in parallel with each other (the FOE is positioned at the infinity above the frame) as shown in FIG. 26B.

Still moreover, although in the above-described embodiments the image composing unit 45, 45a is made to produce a composite image using all pixels, it is also appropriate that a composite image is produced using only pixels on notice lines set by the notice line setting unit 127. In this case, the processing quantity in the image composing unit 45, 45a is considerably reducible.

However, since there is a possibility that a plurality of starting points exists on the same notice line, it is preferable that the comparator 111 controls the timing of the completion of image composing according to starting point to prevent the loci different in starting point from each other from being connected to each other.

Yet moreover, although in the above-described embodiment the position calculating unit 106 uses the mounting data set in advance, it is also appropriate that, in a case in which a vehicle body falls into a sinking condition due to the loading of a heavy thing, the vehicle body sinking is detected to correct the mounting height forming one of mounting data.

In addition, although in the above-described embodiment the image pickup device 13 is mounted on a vehicle and the detection of the position of a static body is made on the basis of a composite image made from input images continuously picked up by the image pickup device 13, it is also appropriate that the image pickup device 13 is fixed in place and the position or movement quantity of a moving body is obtained on the basis of displacement data obtained from a composite image of input images continuously taken by the image pickup device 13.

It should be understood that the present invention is not limited to the above-described embodiments, and that it is intended to cover all changes and modifications of the embodiments of the invention herein which do not constitute departures from the spirit and scope of the invention.

What is claimed is:

1. A moving body detecting apparatus comprising:
   image acquiring means for acquiring a plurality of static images of a predetermined region of a real space sequentially in time; and
   extracting means for extracting a figure indicating a candidate moving body from said plurality of static images;
   setting means for setting a watching region in said predetermined region of said real space, the watching region defining a high probability of existence of said candidate moving body;
   first determining means for determining whether or not said candidate moving body is a moving body which moves in said watching region by using information about said figure indicating said candidate moving body extracted from said plurality of static images by said extracting means;
   classifying means for classifying said watching region of two or more of the images into either an allowable area or an unallowable area based on an extracted result of the extracting means, said allowable area allowing said moving body to exist therein and said unallowable area prohibiting said moving body from existing therein; and
   second determining means for determining that said moving body moves only when said figure indicating said candidate moving body moves from said allowable area to said unallowable area.

2. The apparatus according to claim 1, wherein each of said allowable area and said unallowable area is prescribed by a boundary line of its outer circumference.

3. The apparatus according to claim 1, further comprising:
difference calculating means for calculating a difference of luminance level of images and producing a difference image based on said calculated difference of luminance images,
wherein said image acquiring means acquires a background image of said predetermined region of said real space in addition to said plurality of static images and measures said luminance level of each of said point of said each image of both said plurality of static images and said background image of a predetermined region of a real space,
wherein said difference calculating means calculates a difference in luminance level at each point between each of said plurality of static images and said background image, and produces a plurality of differential images based on said difference in luminance level at each point between said each of said plurality of static images and said background image, and
third determining means for determining if said candidate moving body is a moving body which moves in said watching region based upon a comparison between said plurality of differential images.

4. The apparatus according to claim 3, further comprising preliminary determining means for calculating a difference with respect to said allowable area between said background image and each of said plurality of static images received from said image acquiring means and making a preliminary decision as to whether or not said difference with respect to said allowable area therebetween exceeds a predetermined value based on said calculated result obtained by said difference calculating means,
wherein said third determining means carries out the determination only when a preliminary decision result in said preliminary determining means shows said difference in luminance level at each point with respect to said allowable area between said background image and each of said plurality of static images exceeds said predetermined value.

5. The apparatus according to claim 3, further comprising:
conversion means for converting each of said differential images into binary data and performing image labeling upon said differential images for obtaining information describing at least one of an area and position of said figure of said candidate moving body,
wherein said first determining means determines whether or not said candidate moving body is a moving body which moves in said watching region based on said obtained information describing at least one of an area and position of said figure of said candidate moving body.

6. The apparatus according to claim 1, further comprising:
motion vector calculating means for calculating a motion vector indicative of a difference in position of said figure of said candidate body based upon a luminance level at each point of said each image of both said plurality of static images and said background image; and
third determining means for determining whether or not said candidate moving body is a moving body which moves in said watching region based upon said motion vector of said figure of said candidate body.

7. The apparatus according to claim 6, further comprising:
image composing means for producing a composite image from all or a part of said plurality of static images and said background image of said predetermined region of said real space such that said each point of said composite image have highest luminance level among luminance levels of a corresponding point of said plurality of static images,
wherein said motion vector calculating means for calculating a plurality of motion vectors, each moving vector being indicative of a difference in position of said figure of said candidate body between a first position of said figure of said candidate body in a first image of said plurality of static images and a second one in a second image of said plurality of static images which acquired after said first image by said image acquiring means, and
fourth determining means for determining whether or not said candidate moving body is a moving body which moves in said watching region based on said motion vector of said figure of said candidate body.

8. The apparatus according to claim 7, wherein moving length of said moving body is obtained on the basis of said motion vector extracted by said motion vector calculating means.

9. The apparatus according to claim 1, further comprising notifying means for notifying the existence of a moving body in said predetermined region of said real space to a user when said first determining means concludes that said moving body exists in said watching region in said predetermined region of said real space.

10. The apparatus according to claim 1, further comprising warning means for warning of a moving body in said predetermined region of said real space when said first determining means concludes that said moving body continuously exists in said predetermined region of said real space for a predetermined period of time.

11. The apparatus according to claim 1, wherein said moving body detecting apparatus is used as an antitheft apparatus.

12. The apparatus according to claim 11, wherein said antitheft apparatus is provided with a vehicle.

13. The apparatus according to claim 1, further comprising:
image composing means for producing a composite image from all or a part of said plurality of static images and said background image of said predetermined region of said real space such that each point of said composite image have a highest luminance level among luminance levels of corresponding point of said plurality of static images, and
third determining means for determining whether or not said candidate moving body is a moving body which moves in said watching region based on said composite image.

14. The apparatus according to claim 13, further comprising:
difference calculating means for calculating a difference of luminance level of images and producing a difference image based on said calculated difference of luminance level of images,
wherein said image acquiring means further acquires a background image of said predetermined region of said real space in addition to said plurality of static images and measures a luminance level of each of said point of said each image of both said plurality of static images and said background image of a predetermined region of said real space,
wherein said difference calculating means calculates a difference in luminance level at each point between each of said plurality of static images and said background image, and produces a plurality of differential images based on said difference in luminance level at each point between said each of said plurality of static images and said background image, image composing means produces a composite image from all or a part of said plurality of static image and said background image of said predetermined region of said real space such that said each point of said composite image have highest luminance level among luminance levels of a corresponding point of said plurality of static images, wherein said third determining means determines whether or not said candidate moving body is a moving body which moves in said watching region by using the comparison results compared by the comparison performing means based on said composite image.

15. The apparatus according to claim 13, wherein said third determining means conducts the determining process by which whether or not said candidate moving body is a moving body is judged, repeatedly.

16. The apparatus according to claim 13, further comprising preliminary determining means for calculating a difference with respect to said allowable area between said background image and each of said plurality of static images to make a preliminary determination as to whether or not said difference between said background image and each of said plurality of static images exceeds a predetermined values, wherein said third determining means carries out the determining only when said preliminary determining means concludes that said difference between said allowable area in said background image and each of said plurality of static images is larger than a predetermined level.

17. The apparatus according to claim 13, wherein, when receiving one of said static images from said image acquiring means, said third determining means makes a decision as to whether to select said one of said static images, and continues the decision processing only when selecting said one of said static images.

18. The apparatus according to claim 13, further comprising:

conversion means for converting each of said difference images into binary data and performing image labeling upon said difference images for obtaining an information about at least one of an area and shape of said figure of said candidate moving body, wherein said third determining means determines whether or not said candidate moving body is a moving body which moves in said watching region based on said obtained information about at least one of said area and said shape of said figure of said candidate moving body.

19. The apparatus according to claim 13, further comprising notifying means for notifying the existence of a moving body in said predetermined region of said real space to a user when said third determining means determines that said moving body exists in said watching region.

20. The apparatus according to claim 1, further comprising:

motion vector calculating means for calculating difference in position of said figure of said candidate body estimated from one of said static images captured at a first time and another static images captured at a subsequent time of said first time, wherein said classifying means classifies said watching region into an allowable area and an unallowable area based on said difference vector of positions of said figure of said candidate body obtained by said motion vector calculating means.

21. A method for detecting a moving body, the method comprising:

acquiring a plurality of static images of a predetermined region of a real space sequentially in time;

extracting a figure of a candidate moving body from said plurality of static images of said predetermined region of said real space based on a result of comparing said plurality of static images;

setting a watching region in said predetermined region of said real space, the watching region defining a high probability of existence of said candidate moving body;

classifying said predetermined region of said real space into an allowable area and an unallowable area based on a result of extracting said figure of said candidate moving body from said plurality of static images of said predetermined region of said real space, said allowable area being where existing of said moving body is allowed and said unallowable area being where existing of said moving body is prohibited; and determining whether or not said moving body moves in said watching region based on whether or not said figure of said candidate moving body moves in said watching region from said allowable area to said unallowable area.

22. The method according to claim 21, wherein said classifying step for classifying said predetermined region of said real space into said allowable area and said unallowable area is configured to divide only said watching region of said predetermined region of said real space into said allowable area and said unallowable area.

23. The method according to claim 22, further comprising:

acquiring a background image of said predetermined region of said real space which are captured in advance; and producing a plurality of difference images, each of said difference image is obtained by subtracting said background image of said predetermined region of said real space from each of said plurality of static images of said predetermined region of said real space, wherein said extracting step in which said figure of said candidate moving body is extracted is configured to extract said figure of said candidate moving body based on a result of performing a comparison among said plurality of static images of said predetermined region of said real space.

24. The method according to claim 23, further comprising:

calculating a motion vector being indicative of a difference in position of said figure of said candidate body within a couple of difference images paired up from a plurality of selected images selected from said plurality of difference images of said watching region of said predetermined region of said real space, wherein said determining step is configured to determine whether or not said moving body moves in said watching region based on whether or not said motion vector of said figure of said candidate moving body moves in said watching region from said allowable area to said unallowable area.

25. The method according to claim 24, wherein said plurality of selected images are selected from said plurality of static images of said predetermined region of said real space based on a maximum contrast in brightness of an individual image of said plurality of selected images.

26. The method according to claim 23, further comprising a composite image producing step for producing a composite image of said watching region of said predetermined region of said real space which is made by superposing a plurality of selected images from said plurality of difference images of said predetermined region of said real space obtained in said difference images producing steps, wherein said extracting step is configured to extract said figure of a candidate moving body from said composite image.

27. The method according to claim 26, wherein said composite image producing step is configured to select said plurality of selected images from said plurality of static images of said predetermined region of said real space based on a maximum contrast in brightness within an individual image of said plurality of static images.

28. The method according to claim 27, further comprising a step of calculating area of said figure of said candidate moving body, wherein said determining step is configured to determine whether or not said moving body moves in said watching region is carried out only respect to said candidate body having area larger than a predetermined value.

29. The method according to claim 28, further comprising a recognizing step for issuing a warning of the existence of a moving body in said predetermined region of said real space.

30. The method according to claim 24, further comprising calculating an area of said figure of said candidate moving body, wherein said determining step is configured to determine whether or not said moving body moves in said watching region is carried out only when area of said candidate body is larger than a predetermined value.

31. The method according to claim 30, wherein said producing step uses said plurality of difference images consisting of a plurality of binary data in which each binary data has an information of position thereof on each of said plurality of difference images and data pertaining said figure of a candidate moving body.

32. The method according to claim 31, wherein said information includes in binary data pertaining said figure of said candidate moving body is brightness of a corresponding position of said difference image.

33. The method according to claim 32, further comprising a recognizing step for issuing a warning of the existence of said moving body in said predetermined region of said real space when said determining step concludes that said moving body moves in said watching region.

34. The method according to claim 24, further comprising a composite image producing step for producing a composite image of said watching region of said predetermined region of said real space which is made by superposing said couple of difference images paired up from said plurality of difference images of said watching region of predetermined region of said real space, wherein said determining step is configured to determine whether or not said moving body moves in said watching region is determined based on whether or not said motion vector of said figure of said candidate moving body moves in said watching region from said allowable area to said unallowable area.

35. The method according to claim 34, wherein said composite image producing step is configured to select said plurality of selected images from said plurality of static images of said predetermined region of said real space based on a maximum contrast in brightness of an individual image of said plurality of selected images.

36. The method according to claim 21, further comprising a composite image producing step for producing a composite image of said watching region of said predetermined region of said real space which is made by superposing a plurality of selected images from said plurality of static images of said predetermined region of said real space, wherein said extracting step is configured to extract said figure of said candidate moving body from said composite image.

37. An apparatus for detecting a body moving within a predetermined region of a real space, comprising:
    an imaging device for acquiring a plurality of static images of said predetermined region of said real space sequentially in time;
    a feature calculating unit for extracting a figure of a candidate moving body from said plurality of static images of said predetermined region of said real space based on a result of comparing said plurality of static images of said predetermined region of said real space;
    setting device for setting a watching region in said predetermined region of said real space, the watching region defining a high probability of existence of said candidate moving body;
    an area classifying unit for classifying said predetermined region of said real space into an allowable area and an unallowable area based on a result of extracting said figure of said candidate moving body from said plurality of static images of said predetermined region of said real space, said allowable area being where existing of said moving body is allowed and said unallowable area being where existing of said moving body is prohibited; and
    a motion detecting unit for determining whether or not said moving body moves in said watching region based on whether or not said figure of said candidate moving body moves in said watching region from said allowable area to said unallowable area.

38. The apparatus according to claim 37, wherein said setting device classifies said watching area of said predetermined region of said real space into said allowable area and said unallowable area using information about said figure of said candidate moving body, and divides only said watching region of said predetermined region of said real space into said allowable area and said unallowable area.

39. The apparatus according to claim 38, further comprising:
    a difference calculating unit; and
    an imaging device for further detecting a background image of said predetermined region of said real space, wherein
    said difference calculating unit produces a plurality of difference images of said watching region, each of said difference images of said watching region is obtained by subtracting a corresponding part to said watching region of said background image of said predetermined region of said real space from a further corresponding part to said watching region of each of said plurality of static images, and
    said feature calculating unit extracts said figure of a candidate moving body based on a result of performing a comparison among said plurality of difference images of said watching region.

40. The apparatus according to claim 37, further comprising:
    a difference calculating unit for differentiating a pair of images,
    wherein said difference calculating unit produces a plurality of difference images, each of said difference image is obtained by subtracting said background image of said predetermined region of said real space from each of said plurality of static images of said predetermined region of said real space, and
    said feature calculating unit extracts said figure of said candidate moving body based on a result of performing a comparison among said plurality of difference images.

41. The apparatus according to claim 40, wherein said motion detecting unit further calculates a motion vector being indicative of a difference in position of said figure of said candidate body within a couple of difference images paired up from a plurality of selected images selected from said plurality of difference images of said predetermined region of said real space, and determines whether or not said moving body moves in said watching region is determined based on whether or not said motion vector of said figure of said candidate moving body moves in said predetermined region of said real space from said allowable area to said unallowable area.

42. The apparatus according to claim 41, further comprising:
an image composing unit for producing a composite image of said predetermined region of said real space which is made by superposing a plurality of selected images from said plurality of static images of said predetermined region of said real space,
wherein said feature calculating unit extracts said figure of said candidate moving body from said composite image.

43. The apparatus according to claim 42, wherein an image composing unit selects said plurality of selected images from said plurality of static images of said predetermined region of said real space based on a maximum contrast in brightness within an individual image of said plurality of static images.

44. The apparatus according to claim 43, further comprising:
a recognizing unit for issuing a warning of the existence of a moving body in said predetermined region of said real space,
wherein said recognizing unit issues a warning of the existence of said moving body in said predetermined region of said real space when said determining unit concludes that said moving body moves in said predetermined region of said real space.

45. The apparatus according to claim 41, wherein
said feature calculating unit further calculates area of said figure of said candidate moving body,
said motion detecting unit determines whether or not said moving body moves in said predetermined region of said real space is carried out only when area of said candidate body is larger than a predetermined value.

46. The apparatus according to claim 45, further comprising a recognizing unit for issuing a warning of the existence of a moving body in said predetermined region of said real space, wherein said recognizing unit issues said warning based on a result of whether or not said moving body moves in said predetermined region of said real space.

47. The apparatus according to claim 41, further comprising:
an image composing unit for producing a composite image of said predetermined region of said real space which is made by superposing said a couple of difference images paired up from a plurality of selected images selected from said plurality of difference images of said predetermined region of said real space,
wherein said motion detecting unit determines whether or not said moving body moves in said watching region based on whether or not said motion vector of said figure of said candidate moving body moves in said predetermined region from said allowable area to said unallowable area.

48. The apparatus according to claim 47, wherein
said image composing unit selects said plurality of selected images from said plurality of static images of said predetermined region of said real space based on a maximum contrast in brightness within an individual image of said plurality of static images.

49. The apparatus according to claim 40, wherein said motion detecting unit further calculates a motion vector being indicative of a difference in position of said figure of said candidate body within a couple of difference images paired up from a plurality of selected images selected from said plurality of difference images of said watching region of predetermined region of said real space, and determines whether or not said moving body moves in said watching region is determined based on whether or not said motion vector of said figure of said candidate moving body moves in said watching region from said allowable area to said unallowable area.

50. The apparatus according to claim 49, wherein
said feature calculating unit further calculates area of said figure of said candidate moving body,
said motion detecting unit determines whether or not said moving body moves in said watching region is carried out only when area of said candidate body is larger than a predetermined value.

51. The apparatus according to claim 50, further comprising a recognizing unit for issuing a warning of the existence of a moving body in said predetermined region of said real space, wherein said recognizing unit issues said warning based on a result of whether or not said moving body moves in said watching region.

52. The apparatus according to claim 49, further comprising an image composing unit for producing a composite image of said watching region of said predetermined region of said real space which is made by superposing said couple of difference images paired up from a plurality of selected images selected from said plurality of difference images of said watching region, wherein said motion detecting unit determines whether or not said moving body moves in said watching region based on whether or not said motion vector of said figure of said candidate moving body moves in said watching region from said allowable area to said unallowable area.

53. The apparatus according to claim 52, wherein
said image composing unit selects said plurality of selected images from said plurality of static images of said predetermined region of said real space based on a maximum contrast in brightness within said watching region of an individual image of said plurality of static images.

54. The apparatus according to claim 49, further comprising:
an image composing unit for producing a composite image of said watching region of said predetermined region of said real space which is made by superposing a plurality of selected images from said plurality of static images of said predetermined region of said real space with only respect to said watching region,
wherein said feature calculating unit extracts said figure of said candidate moving body from said composite image.

55. The apparatus according to claim 54, wherein an image composing unit selects said plurality of selected images from said plurality of static images of said predetermined region of said real space based on a maximum contrast in brightness within said watching region of an individual image of said plurality of static images.

56. The apparatus according to claim 55, further comprising:
a recognizing unit for issuing a warning of the existence of a moving body in said watching region,
wherein said recognizing unit issues a warning of the existence of said moving body in said predetermined region of said real space when said determining unit concludes that said moving body moves in said watching region.

57. A moving body detecting method comprising steps of:
acquiring a plurality of static images of a predetermined region in a real space sequentially in time;
comparing said plurality of static images of said predetermined region of said real space; extracting a figure of a candidate moving body from said plurality of static images based on a result of the comparing step;
setting a watching region in said predetermined region in said real space, the watching region being defined as an area to which a smooth traveling path of said candidate moving body is extended from a position where said figure of said candidate moving body is extracted;
classifying said predetermined region of a real space into an allowable area and an unallowable area based on a result of the extracting step, said allowable area allowing said moving body to exist therein and said unallowable area not allowing said moving body to exist therein;
judging whether or not said figure of said candidate moving body moves in said watching region from said allowable area to said unallowable area; and
determining whether or not said moving body moves in said watching region based on a result of the judgment whether or not said figure of said candidate moving body moves in said watching region from said allowable area to said unallowable area.

58. The moving body detecting method according to claim 57, further comprising steps of: acquiring a background image of said predetermined region of a real space which are captured in advance; and producing a plurality of difference images, each of said difference image is obtained by subtracting said background image of said predetermined region of a real space from each of said plurality of static images of a predetermined region of a real space, wherein said extracting step in which said figure of said candidate moving body is extracted is configured to extract said figure of said candidate moving body based on a result of performing a comparison among said plurality of static images of said predetermined region of a real space.

59. The moving body detecting method according to claim 58, further comprising a step of: calculating a motion vector being indicative of a difference in position of said figure of said candidate body within a couple of difference images paired up from a plurality of selected images selected from said plurality of difference images of said watching region of predetermined region of a real space, wherein determining step is configured to determine whether or not said moving body moves in said watching region based on whether or not said motion vector of said figure of said candidate moving body moves in said watching region from said allowable area to said unallowable area.

60. The moving body detecting method according to claim 59, further comprising a step of:
producing step for producing a composite image of said watching region of said predetermined region of a real space which is made by superposing a plurality of selected images from said plurality of static images of said predetermined region of a real space, wherein said extracting step is configured to extract said figure of said candidate moving body from said composite image.

61. An apparatus that detects a body moving within a predetermined region of a real space, comprising:
an imaging device that acquires a plurality of static images of a predetermined region in a real space sequentially in time;
a comparing device that compares said plurality of static images acquired by said imaging device;
a feature calculating device that extracts a figure of a candidate moving body from said plurality of static images based on a comparison result obtained by the comparing device;
a setting device that sets a watching region in said predetermined region in said real space, the watching region being, defined as an area to which a smooth traveling path of said candidate moving body is extended from a position where said figure of said candidate moving body is extracted by said feature calculating unit;
a classifying device that classifies said predetermined region of a real space into an allowable area and an unallowable area based on a result of the extracting step, said allowable area allowing said moving body to exist therein and said unallowable area not allowing said moving body to exist therein;
a judging device that judges whether or not said figure of said candidate moving body moves in said watching region from said allowable area to said unallowable area; and a motion detecting device that determines whether or not said moving body moves in said watching region based on a judgment preformed by the judging unit.

62. The apparatus according to claim 61, wherein said imaging device further acquires a background image of said predetermined region of said real space which are captured in advance, further comprising:
a producing device that produces a plurality of difference images, each of said difference image is obtained by subtracting said background image from each of said plurality of static images acquired by said imaging device, wherein said feature calculating device extracts said figure of said candidate moving body based on the comparison result performed by the comparing device.

63. The apparatus according to claim 62, further comprising: a calculating device that calculates a motion vector being indicative of a difference in position of said figure of said candidate body within said couple of difference images paired up from said plurality of selected images selected from said plurality of difference images acquired by said imaging device, and a motion detecting device that determines whether or not said motion vector of said figure of said candidate moving body moves in said watching region from said allowable area to said unallowable area, wherein said motion detecting device determines whether or not said moving body moves in said watching region based on the result obtained by the motion detecting device.

64. The apparatus according to claim 63, further comprising; a producing device that produces a composite image of said watching region of said predetermined region of said real space which is made by superposing a plurality of selected images from said plurality of static images of said predetermined region of a real space, wherein said feature calculating device extracts said figure of said candidate moving body from said composite image.

* * * * *